US008778071B2

United States Patent
Matsuyama et al.

(10) Patent No.: US 8,778,071 B2
(45) Date of Patent: Jul. 15, 2014

(54) INKJET INK SET, IMAGE FORMING METHOD USING SAME, AND PRINT FORMED BY THE IMAGE FORMING METHOD

(75) Inventors: Akihiko Matsuyama, Shizuoka (JP); Hiroshi Gotou, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 280 days.

(21) Appl. No.: 13/358,044

(22) Filed: Jan. 25, 2012

(65) Prior Publication Data

US 2012/0207983 A1 Aug. 16, 2012

(30) Foreign Application Priority Data

Feb. 10, 2011 (JP) .................. 2011-027901

(51) Int. Cl.
*C09D 11/02* (2014.01)
(52) U.S. Cl.
USPC .......... 106/31.43; 106/31.48; 106/31.49; 106/31.51; 106/31.52; 106/31.58; 106/31.59
(58) Field of Classification Search
CPC ....... C09D 11/328; C09D 11/38; C09D 11/40
USPC .......... 106/31.43, 31.58, 31.59, 31.48, 31.49, 106/31.51, 31.52; 347/100; 428/195.1
See application file for complete search history.

(56) References Cited

U.S. PATENT DOCUMENTS

| 5,734,403 | A * | 3/1998 | Suga et al. ................. 347/101 |
| 7,919,544 | B2 | 4/2011 | Matsuyama et al. |
| 7,977,408 | B2 | 7/2011 | Matsuyama et al. |
| 2007/0197685 | A1 | 8/2007 | Aruga et al. |
| 2008/0092773 | A1 | 4/2008 | Matsuyama |
| 2008/0233363 | A1 | 9/2008 | Goto |
| 2009/0047431 | A1 | 2/2009 | Hatada et al. |
| 2009/0098312 | A1 | 4/2009 | Goto et al. |
| 2009/0176070 | A1 | 7/2009 | Goto et al. |
| 2009/0186162 | A1 | 7/2009 | Namba et al. |
| 2010/0196601 | A1 | 8/2010 | Goto et al. |

(Continued)

FOREIGN PATENT DOCUMENTS

| JP | 2007-145926 | 6/2007 |
| JP | 2010-168433 | 8/2010 |
| JP | 2011-184518 | 9/2011 |

OTHER PUBLICATIONS

English translation of JP 2010/168433; Aug. 2010.*

(Continued)

*Primary Examiner* — Helene Klemanski
(74) *Attorney, Agent, or Firm* — Oblon, Spivak, McClelland, Maier & Neustadt, L.L.P.

(57) ABSTRACT

An inkjet ink set including at least a black ink, a cyan ink, a magenta ink, and a yellow ink. Each of the inks includes at least a water-soluble dye, water and a water-soluble solvent including a specific alkoxypropionamide compound. The cyan, magenta and yellow inks has a S/W ratio of not less than 1.5 and not greater than 3.5, wherein S represents the content of the water-soluble solvent in each ink, and W represents the content of water in each ink, and the black ink has a S/W ratio of not less than 1.0 and less than 1.5, wherein S represents the content of the water-soluble solvent in the black ink, and W represents the content of water in the black ink.

9 Claims, 2 Drawing Sheets

(56) References Cited

U.S. PATENT DOCUMENTS

| | | |
|---|---|---|
| 2010/0196602 A1 | 8/2010 | Koyano et al. |
| 2010/0285287 A1 | 11/2010 | Matsuyama et al. |
| 2010/0295891 A1 | 11/2010 | Goto et al. |
| 2011/0057981 A1 | 3/2011 | Aruga et al. |
| 2011/0164086 A1 | 7/2011 | Ggoto et al. |
| 2011/0205288 A1 | 8/2011 | Matsuyama et al. |
| 2011/0216123 A1 | 9/2011 | Tamai et al. |
| 2011/0292114 A1* | 12/2011 | Sao et al. ............... 106/31.58 |
| 2011/0292141 A1* | 12/2011 | Sao et al. ............... 347/100 |
| 2012/0056929 A1* | 3/2012 | Sao et al. ............... 347/20 |
| 2012/0306964 A1* | 12/2012 | Nakajima ............... 347/22 |
| 2012/0328853 A1* | 12/2012 | Matsuyama et al. ...... 428/195.1 |
| 2012/0328854 A1* | 12/2012 | Matsuyama et al. ...... 106/31.43 |
| 2013/0113860 A1* | 5/2013 | Gotou et al. ............... 347/20 |
| 2013/0194343 A1* | 8/2013 | Yokohama et al. ........ 347/20 |
| 2013/0194344 A1* | 8/2013 | Yokohama et al. ........ 347/20 |
| 2013/0323474 A1* | 12/2013 | Gotou et al. ............... 428/195.1 |

OTHER PUBLICATIONS

Abstract of JP 2010/180332; Aug. 2010.*

* cited by examiner

INKJET INK SET, IMAGE FORMING METHOD USING SAME, AND PRINT FORMED BY THE IMAGE FORMING METHOD

CROSS-REFERENCE TO RELATED APPLICATIONS

This patent application is based on and claims priority pursuant to 35 U.S.C. §119 to Japanese Patent Application No. 2011-027901, filed on Feb. 10, 2011 in the Japan Patent Office, the entire disclosure of which is hereby incorporated herein by reference.

FIELD OF THE INVENTION

The present invention relates to an inkjet ink set. In addition, the present invention also relates to an image forming method using the inkjet ink set, and a print formed by the image forming method.

BACKGROUND OF THE INVENTION

Since inkjet image forming methods have such advantages as low noise and low running costs over other image forming methods, the inkjet image forming methods become widely used recently. In addition, inkjet printers capable of forming full color images on plain paper are actively marketed recently. However, it is difficult for such inkjet inks to fulfill all the requirements such that images having a good combination of color reproducibility, abrasion resistance, durability, light resistance, and drying property can be produced without causing problems such as feathering (blurring), color bleeding (i.e., blurring on the boundary portion of color images), curl of copies, and nozzle clogging in that ink ejection nozzles are clogged with the inks; and duplex copies can be produced without causing any problem such as penetration of ink into the backside of a recording material. Therefore, inkjet inks fulfilling higher-priority requirements of an inkjet printer are used for the inkjet printer now.

Inkjet inks typically include water as a main component while including a colorant, and a wetting agent such as glycerin, which is added to prevent occurrence of the nozzle clogging problem. Dyes or pigments are used for the colorant. Dyes are superior to pigments in coloring property, but are inferior to pigments in resistance to light, gasses and water. In other words, pigments are superior to dyes in resistance to light, gasses and water, and are inferior to dyes in coloring property.

Specifically, dye-based inkjet inks tend to cause a blurring problem in that images formed on plain paper are blurred, particularly, at boundary portions of a black ink image and a color ink image (i.e., this phenomenon is hereinafter referred to as color bleeding). In attempting to solve the color bleeding problem, there is a proposal to use a combination of a black ink and color inks having higher permeability to paper than the black ink, so that the black ink in a black image does not penetrate into images of the color inks. In this proposal, the permeability is controlled by adjusting the added amount of a surfactant included in the inks. However, the color bleeding property of such a dye-based ink is still inferior to that of a pigment-based ink. In addition, there is a proposal to use inks having a relatively high viscosity to lower the permeability of the inks. However, in order to stably eject inks from nozzles, the viscosity of inks has an upper limit, and therefore good effect cannot be produced by the technique.

With respect to inkjet recording methods, serial recording methods in which an image is formed on a recording material while moving a recording head in a main scanning direction (i.e., in the width direction of the recording material) have been conventionally used. When images are recorded on A-4 paper sheets at a pixel density of 600×300 dpi by using a printer using a serial recording method, the copying speed is 30 copies per minute at most.

However, recently a line printer having a line recording head having the same length as the maximum width of recording materials is developed. By using such a line printer, more than 200 copies can be produced per minute when images are recorded on A-4 paper sheets at a pixel density of 600×300 dpi. Thus, high speed recording has also been pursued in inkjet recording.

When high speed inkjet recording is performed, a curling problem in that images are recorded on a plain paper using aqueous inks, the resultant copy has large curl is easily caused. Since a seriously curled copy is easily jammed in a sheet feeding passage of a printer, it is difficult for the printer to perform high speed inkjet recording (hereinafter this problem is referred to as a jamming problem). The reason why a copy having an image formed by an aqueous ink is curled is considered to be as follows. Specifically, water included in ink images formed on a paper sheet serving as a recording material penetrates into cellulose fibers in the paper sheet while cutting the hydrogen bonds between the cellulose fibers of the paper sheet, thereby swelling (i.e., extending) the surface of the paper sheet, on which the image is formed. In this regard, since the backside of the paper sheet is not swelled (i.e., not extended), the paper sheet is curled toward the backside.

In inkjet recording, high speed recording can be easily performed if the ink droplets ejected by nozzles have relatively large size. In this case, the amount of inks adhered to a recording material per a unit area increases, and therefore the resultant copy has relatively large curl. In addition, sharpness and half tone property of the recorded images deteriorate. In contrast, when the ink droplets ejected by nozzles have relatively small size, occurrence of the above-mentioned problems can be prevented, but the recording time seriously increases, resulting in deterioration of copy productivity to an extent such that the recording method cannot be practically used.

In attempting to solve the curling problem, a technique such that a print having an image thereon is heated to evaporate water included therein is also proposed. However, since a large amount of energy is needed for heating the print, the printer loses one of the advantages, i.e., energy saving. In addition, the inkjet printer is required to have a heating space, the printer loses another advantage, space saving.

Although curl is formed on a paper sheet just after recording images thereon, the degree of curl is reduced with time because water penetrating into the paper sheet evaporates. However, even when water included in the ink images completely evaporates, the curled copy does not return to the original form of the paper sheet (i.e., a flat form). Therefore, it is difficult to practically use a recording method forming such a curled copy.

In contrast, oil-based inks do not cause the curling problem because of including no water, and therefor oil-based inks are considered to be suitable for high speed recording. However, oil-based inkjet inks typically have a low viscosity, and therefore the inks penetrate into recording papers at a high speed, resulting in formation of low density images. In addition, such inks penetrate into the backside of paper sheets (hereinafter referred to as a ink penetration problem), duplex copies cannot be formed. Further, since recorded images are seriously blurred, character images having good image qualities cannot be formed. Therefore, oil-based inkjet inks are used only for limited applications now.

For these reasons, the inventors recognized that there is a need for an inkjet ink set which can produce high quality images without causing problems such as the curling problem, the ink penetration problem and the bleeding problem mentioned above.

BRIEF SUMMARY OF THE INVENTION

As an aspect of the present invention, an inkjet ink set is provided which includes at least a black ink, a cyan ink, a magenta ink and a yellow ink. Each of the inks includes at least a water-soluble dye, water and a water-soluble solvent having the following formula (1):

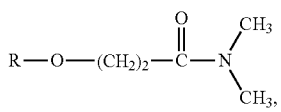

(1)

wherein R represents a linear alkyl group (i.e., an alkyl group with no branch) having 1 to 5 carbon atoms.

In addition, each of the cyan, magenta and yellow inks satisfies a relationship $1.5 \leq S/W \leq 3.5$, wherein S represents the content of the water-soluble solvent in each ink, and W represents the content of water in each ink, and the black ink satisfies another relationship $1.0 \leq S/W < 1.5$, wherein S represents the content of the water-soluble solvent in the black ink, and W represents the content of water in the black ink.

As another aspect of the present invention, an image forming method is provided which includes ejecting droplets of the inkjet ink set mentioned above toward a recording material to form an image on the recording material.

As yet another aspect of the present invention, a print is provided which includes a support; and an image formed on the support by the image forming method mentioned above.

The aforementioned and other aspects, features and advantages will become apparent upon consideration of the following description of the preferred embodiments taken in conjunction with the accompanying drawings.

DETAILED DESCRIPTION OF THE INVENTION

Figure 1:
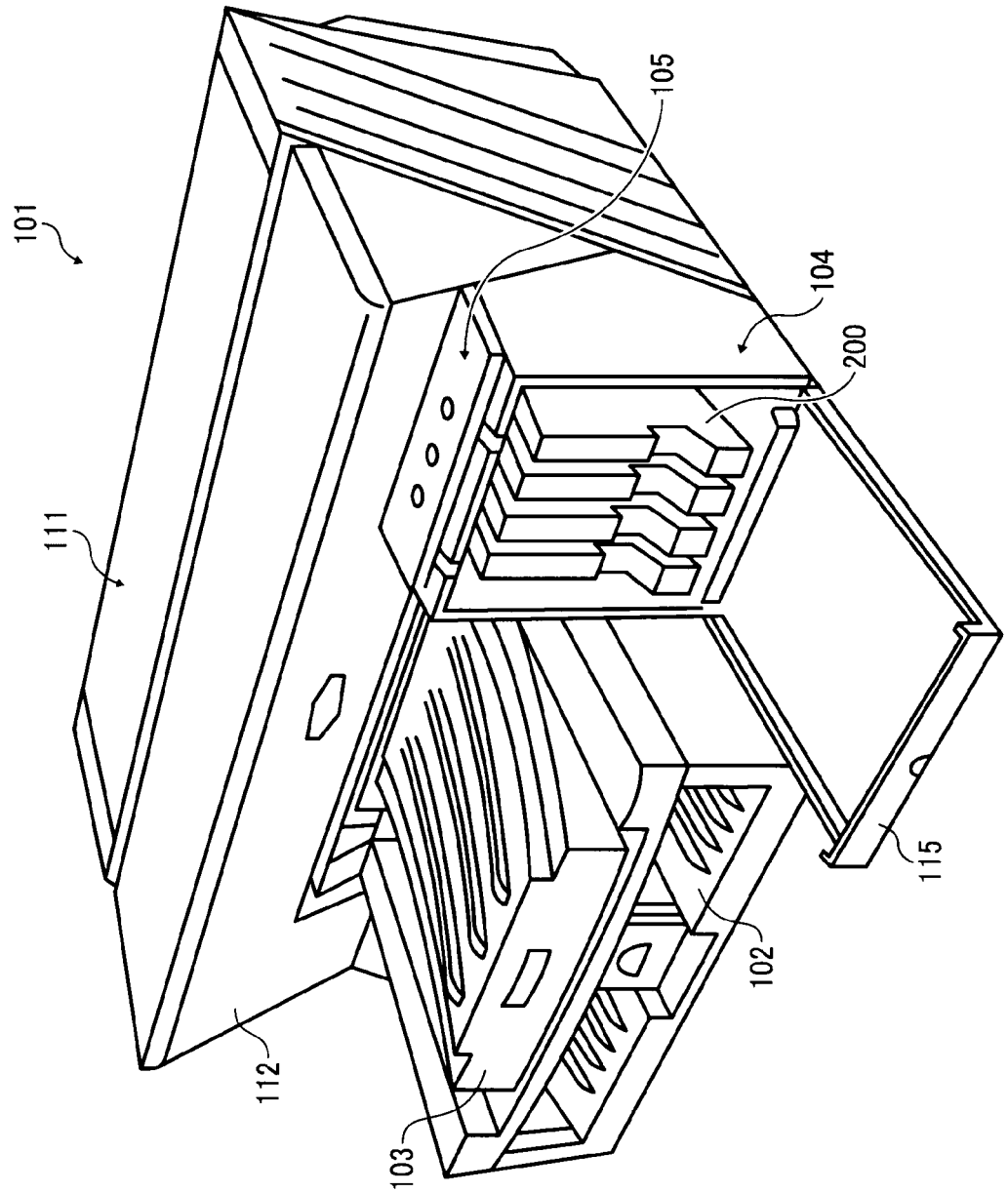
FIG. 1 is a schematic perspective view illustrating an inkjet recording apparatus for use in the image forming apparatus of the present invention.

Initially, the inkjet ink of the present invention will be described. The inkjet ink set of the present invention includes at least a black ink, a cyan ink, a magenta ink and a yellow ink, wherein each of the inks includes at least a water-soluble dye, water and a water-soluble solvent having the below-mentioned formula (1):

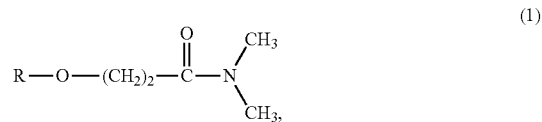

(1)

wherein R represents a linear alkyl group (i.e., an alkyl group with no branch) having 1 to 5 carbon atoms.

In addition, each of the cyan, magenta and yellow inks satisfies a relationship $1.5 \leq S/W \leq 3.5$, wherein S represents the content of the water-soluble solvent in each ink, and W represents the content of water in each ink, and the black ink satisfies another relationship $1.0 \leq S/W < 1.5$, wherein S represents the content of the water-soluble solvent in the black ink, and W represents the content of water in the black ink.

A published unexamined Japanese patent application No. 2007-145926 discloses an inkjet ink set, each of the inks includes a colorant, water in an amount of from 10 to 50%, and an organic solvent having a SP value of from 16.5 to 24.6 in an amount of not less than 30%. The S/W ratio of these inks partially overlaps with the above-mentioned ranges, but the water-soluble solvent included in the ink set of the present invention has a SP value of from 10.3 to 12.8, which does not fall in the SP value range of the background ink set.

A published unexamined Japanese patent application No. 2010-168433 discloses an ink including a water-soluble solvent having the above-mentioned formula (1), but the ink is a pigment ink and is different from the inks of the inkjet ink set of the present invention.

By using the inkjet ink set of the present invention in which the ratio S/W of the color inks is greater than the ratio of the black ink, occurrence of the bleeding problem can be prevented. In addition, since the amount of the water-soluble solvent and the amount of water are balanced in the inks of the ink set, occurrence of the curl problem can be prevented even when images are formed on plain paper, and occurrence of the penetration problem can also be prevented.

The inks of inkjet ink set of the present invention include water as a liquid medium. In addition, the inks include one or more water-soluble solvents as a humectant to prevent the inks from drying, and a penetrant to impart permeability to the inks.

As mentioned above, the ratio (S/W) is not less than 1.5 and not greater than 3.5 for the color inks. When the ratio (S/W) falls in the range, clear color images can be formed without causing the color bleeding problem. In addition, since crystallization of the dye or precipitation of the dye used can be prevented, good ejection stability can be imparted to the ink, resulting in stabilization of inkjet recording. In this regard, even when a water-soluble solvent having a relatively high boiling point is used, the inks may cause a fire if the solvent has a flash point and the added amount of the solvent is large, because the inks themselves have a flash point. Therefore, it is preferable to select a water-soluble solvent while controlling the content thereof, so that the ink itself does not have a flash point.

The ratio (S/W) is not less than 1.0 and less than 1.5 for the black ink. When the ratio (S/W) falls in the range, clear black images can be stably formed without causing the above-mentioned curling problem, and the above-mentioned jamming problem and an image quality deterioration problem which is caused by curl of the recording material sheet and in which a recorded image on a curled recording material sheet is easily abraded by feeding members and guide members of the inkjet recording apparatus, thereby damaging the recorded images.

Specific examples of the water-soluble solvents for use as a humectant in the inks of the inkjet ink set of the present invention include polyalcohols such as ethylene glycol, diethylene glycol, triethylene glycol, tetraethylene glycol, polyethylene glycol, propylene glycol, dipropylene glycol, tripropylene glycol, polypropylene glycol, 1,3-butanediol, 3-methyl-1,3-butanediol, 1,5-pentanediol, 1,6-hexanediol, glycerin, 1,2,3-butanetriol, 1,2,4-butanetriol, 1,2,6-hexanetriol, trimethylol ethane, trimethylol propane, and petriol; polyalcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyalcohol aryl ethers such as ethylene glycol monophenyl ether, and ethylene glycol monobenzyl ether; nitrogen-containing heterocyclic compounds such as 2-pyrrolidone, N-methyl-2-pyrrolidone, N-hydroxyethyl-2-pyrrolidone, 1,3-dimethylimidazolidinone, ε-caprolactam, and γ-butyrolactone; amides such as formamide, N-methylformamide, N,N-dimethylformamide, and alkoxypropionamide having the above-mentioned formula (1); amines such as monoethanolamine, diethanolamine, triethanolamine, monoethylamine, diethylamine, and triethylamine; sulfur-containing compounds such as dimethylsulfoxide, sulfolane, and thiodiethanol; propylene carbonate, ethylene carbonate, etc.

Saccharide and its derivatives can also be used as humectants. Saccharide includes monosaccharide, disaccharide, oligosaccharide (including trisaccharide and tetrasaccharide), and polysaccharide. Specific examples thereof include glucose, mannose, fructose, ribose, xylose, arabinose, galactose, maltose, cellobiose, lactose, sucrose, trehalose, maltotriose, and the like. In this regard, polysaccharide means saccharide in a broad sense, and includes α-cyclodextrin, cellulose, and the like, which are present in nature.

Specific examples of the derivatives of saccharide include reduction sugar such as sugar alcohol having a formula, $HOCH_2(CHOH)_nCH_2OH$ (n is an integer of from 2 to 5), oxidation sugar (such as aldonic acid and uronic acid), amino acid, thioic acid, and the like. Among these derivatives of saccharide, sugar alcohols are preferable, and specific examples thereof include maltitol, and sorbit.

The inks of the inkjet ink set of the present invention preferably include, as a humectant, a water-soluble solvent having a formula (1)-1, $CH_3$—$O$—$(CH_2)_2$—$CO$—$N(CH_3)_2$ (i.e., N,N-dimethyl-β-methoxypropionamide, which has formula (1) in which R is —$CH_3$), a water-soluble solvent having a formula (1)-2, $C_4H_9$—$O$—$(CH_2)_2$—$CO$—$N(CH_3)_2$ (i.e., N,N-dimethyl-β-butoxypropionamide, which has formula (1) in which R is —$C_4H_9$), glycerin, 1,3-butanediol, 3-methyl-1,3-butanediol, 3-ethyl-3-hydroxymethyloxetane, or the like. By using such a water-soluble solvent as a humectant, a good combination of preservability and ejection stability can be imparted to the inks.

When a water-soluble solvent is used for the inks as a humectant, the content thereof is preferably from 30% to 85% by weight, and more preferably from 40% to 80% by weight, based on the weight of the inks.

When a water-soluble solvent is used as a penetrant, polyols having 8 to 11 carbon atoms such as 2-ethyl-1,3-hexanediol, and 2,2,4-trimethyl-1,3-pentanediol are preferably used. The content thereof is preferably from 0.1% to 5% by weight, and more preferably from 0.5% to 3% by weight, based on the weight of the inks.

The penetrant will be described later in detail.

When a penetrant is added to the inks, the surface tension of the inks decreases, thereby improving the filling property of the inks to inkjet nozzles, resulting in improvement of the ejection stability of the inks. In addition, since droplets of the inks adhered to a recording material rapidly penetrate into the recording material, the chance of occurrence of the feathering problem and the color bleeding problem mentioned above can be reduced.

Specific examples of the materials for use as the penetrant include the water-soluble solvents mentioned above and surfactants having the following formula (2) or (3).

$$HOR^1R^3C—(CH_2)_j—CR^2R^4OH \quad (2),$$

wherein each of $R^1$ and $R^2$ represents an alkyl group having 3 to 6 carbon atoms, each of $R^3$ and $R^4$ represents an alkyl group having 1 to 2 carbon atoms, and j is an integer of from 1 to 6.

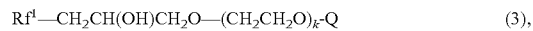

$$Rf^1—CH_2CH(OH)CH_2O—(CH_2CH_2O)_k-Q \quad (3),$$

wherein $Rf^1$ represents —$C_3F_7$ or —$C_4F_9$, Q represents a group having a formula —$C_bH_{2b+1}$ (b is an integer of from 11 to 19), —$CH_2CH(OH)CH_2$—$C_3F_7$, or —$CH_2CH(OH)CH_2$—$C_4F_9$, and k is an integer of from 20 to 35.

Surfactants having a function of imparting permeability to the inks, such as nonionic surfactants, anionic surfactants, and ampholytic surfactants, which are classified based on the hydrophilic groups thereof, are preferably used. Among these surfactants, silicone-based surfactants and fluorine-containing surfactants, which are classified based on the hydrophobic groups thereof, are preferable. One or more surfactants can be used for the inks of the inkjet ink set of the present invention.

Since the surfactants having formula (2) have a solubility in water of less than 0.1% by weight, the content of such a surfactant in the inks, which include a water-soluble solvent and water, is preferably less than 1% by weight, and more preferably from 0.01% to 0.5% by weight, based on the weight of the inks.

Among these surfactants having formula (2), a compound having the following formula (2)-1 (i.e., 2,5,8,11-tetramethyldodecane-5,8-diol, which has formula (2) in which each of $R^1$ and $R^2$ is —$C_5H_{11}$, each of $R^3$ and $R^4$ is —$CH_3$, and j is 2) is preferable.

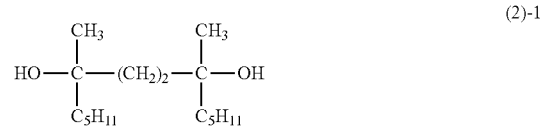

(2)-1

Specific examples of the materials for use as fluorine-containing surfactants include perfluoroalkylsulfonates, perfluoroalkylcarboxylates, perfluoroalkylphosphates, perfluoroalkyl ethylene oxide adducts, perfluoroalkyl betaine, perfluoroalkylamine oxides, perfluoroalkylether compounds, and the like. Among these fluorine-containing surfactants, compounds having formula (3) are preferable, and compounds having the following formula (3)-1 (i.e., $Rf^1$ is —$C_4F_9$, Q is —$CH_2CH(OH)CH_2$—$C_4F_9$, and k is 23 in formula (3)) are more preferable.

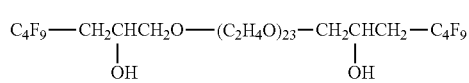

Next, the water-soluble dyes for use as the colorants of the inks of the inkjet ink set of the present invention will be described.

Among water-soluble dyes, direct dyes, acidic dyes, basic dyes, and reactive dyes are preferable, and dyes having the below-mentioned formula (4), (5), (6) or (7) are particularly preferable because of having good coloring property.

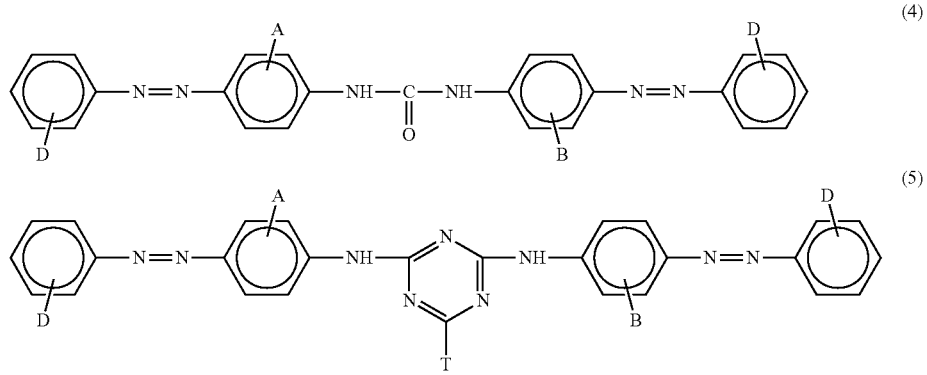

wherein A represents an alkoxyl group, B represents an alkoxyl group, T represents an alkanolamine group, and D represents —$SO_3M$ wherein M represents an alkali metal;

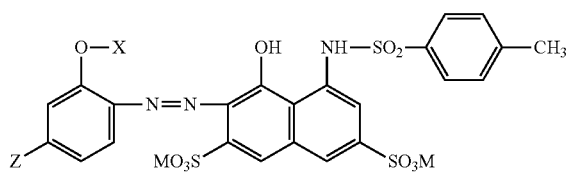

wherein X represents a hydrogen atom or a phenyl group, Z represents a hydrogen atom or a halogen atom, and M represents an alkali metal;

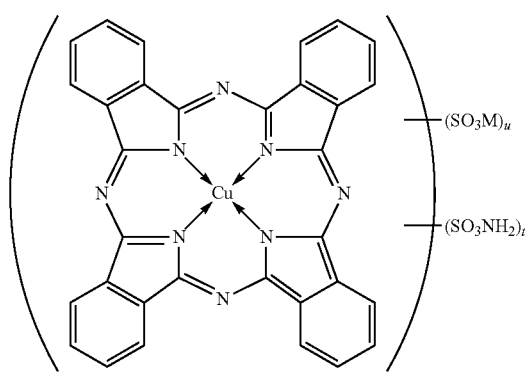

wherein M represents an alkali metal or a quaternary ammonium group, t is 0 or an integer of 1 to 3, and u is 1 or 2.

Specific examples of the water-soluble dyes for use in the inkjet inks of the inkjet ink set of the present invention include the following dyes, but are not limited thereto.

1. Direct Dyes

C.I. Direct Reds 2, 4, 9, 23, 26, 31, 39, 62, 63, 72, 75, 76, 79, 80, 81, 83, 84, 89, 92, 95, 111, 173, 184, 207, 211, 212, 214, 218, 221, 223, 224, 225, 226, 227, 232, 233, 240, 241, 242, 243 and 247.

C.I. Direct Violets 7, 9, 47, 48, 51, 66, 90, 93, 94, 95, 98, 100 and 101.

C.I. Direct Yellows 8, 9, 11, 12, 27, 28, 29, 33, 35, 39, 41, 44, 50, 53, 58, 59, 68, 86, 87, 93, 95, 96, 98, 100, 106, 108, 109, 110, 130, 132, 142, 144, 161 and 163.

C.I. Direct Blues 1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289 and 291.

C.I. Direct Blacks 9, 17, 19, 22, 32, 51, 56, 62, 69, 77, 80, 91, 94, 97, 108, 112, 113, 114, 117, 118, 121, 122, 125, 132, 146, 154, 166, 168, 173, 195 and 199.

2. Acidic Dyes

C. I. Acid Reds 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 361, 396 and 397.

C. I. Acid Violets 5, 34, 43, 47, 48, 90, 103 and 126.

C. I. Acid Yellows 17, 19, 23, 25, 39, 40, 42, 44, 49, 50, 61, 64, 76, 79, 110, 127, 135, 143, 151, 159, 169, 174, 190, 195, 196, 197, 199, 218, 219, 222 and 227.

C.I. Acid Blues 9, 25, 40, 41, 62, 72, 76, 78, 80, 82, 92, 106, 112, 113, 120, 127:1, 129, 138, 143, 175, 181, 205, 207, 220, 221, 230, 232, 247, 258, 260, 264, 271, 277, 278, 279, 280, 288, 290 and 326.

C. I. Acid Blacks 7, 24, 29, 48, 52:1 and 172.

3. Basic Dyes

C.I. Basic Yellows 1, 2, 11, 13, 14, 15, 19, 21, 23, 24, 25, 28, 29, 32, 36, 40, 41, 45, 49, 51, 53, 63, 65, 67, 70, 73, 77, 87 and 91.

C.I. Basic Reds 2, 12, 13, 14, 15, 18, 22, 23, 24, 27, 29, 35, 36, 38, 39, 46, 49, 51, 52, 54, 59, 68, 69, 70, 73, 78, 82, 102, 104, 109 and 112.

C.I. Basic Violets 1, 3, 7, 10, 11 and 27.

C.I. Basic Blues 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147 and 155.

C.I. Basic Blacks 2 and 8.

4. Reactive Dyes

C.I. Reactive Yellows 1, 2, 3, 5, 11, 13, 14, 15, 17, 18, 20, 21, 22, 23, 24, 25, 26, 27, 29, 35, 37, 40, 41, 42, 47, 51, 55, 65 and 67.

C.I. Reactive Reds 1, 3, 13, 14, 17, 19, 21, 22, 23, 24, 25, 26, 29, 31, 32, 35, 37, 40, 41, 43, 44, 45, 46, 49, 55, 60, 66, 74, 79, 96, 97 and 180.

C.I. Reactive Violets 1, 3, 4, 5, 6, 7, 8, 9, 16, 17, 22, 23, 24, 26, 27, 33 and 34.

C.I. Reactive Blues 1, 2, 3, 5, 7, 8, 10, 13, 14, 15, 17, 18, 19, 21, 23, 25, 26, 27, 28, 29, 32, 35, 38, 41, 63, 80 and 95.

C.I. Reactive Blacks 3, 4, 5, 7, 8, 11, 12, 14, 17, 21, 23, 26, 31, 32 and 34.

The inks of the inkjet ink set of the present invention can optionally include a pH controlling agent to control the pH of the inks so that the inks are alkaline. In this case, the inks have a good combination of dispersibility and ejection stability. However, when the pH is not less than 11, the inkjet recording heads and the ink supplying members used are seriously dissolved by the inks, thereby degenerating the inks while causing an ink leaking problem in that the inks leak from ink supplying members and a defective ejection problem in that the inks are not satisfactorily ejected from recording heads.

Specific examples of the materials for use as the pH controlling agent include alcohol amines (e.g., diethanolamine, triethanolamine, and 2-amino-2-ethyl-1,3-propanediol), alkali metal hydroxides (e.g., lithium hydroxide, sodium hydroxide, and potassium hydroxide), ammonium hydroxides (e.g., ammonium hydroxide, and quaternary ammonium hydroxide), phosphonium hydroxides (e.g., quaternary phosphonium hydroxide), alkali metal carbonates (e.g., lithium carbonate, sodium carbonate and potassium carbonate), and the like The inks of the inkjet ink set of the present invention can optionally include conventional additives such as antiseptic/fungicide, chelating agents, antirusts, antioxidants, ultraviolet absorbents, oxygen absorbents, light stabilizers, kogation preventing agents to prevent a colorant in an ink from being burned by a heater in a thermal recording head, and the like.

Specific examples of the materials for use as the antiseptic/fungicide include sodium dehydroacetate, sodium sorbate, sodium 2-pyridinethiol-1-oxide, sodium benzoate, sodium pentachlorophenolate, and the like.

Specific examples of the materials for use as the chelating agent include sodium ethylenediaminetetraacetate, sodium nitrilotriacetate, sodium hydroxyethylethylenediaminetriacetate, sodium diethylenetriaminepentaacetate, sodium uramildiacetate, and the like.

Specific examples of the materials for use as the antirust include acidic sulfites, sodium thiosulfate, ammonium thiodiglycolate, diisopropylammonium nitrite, pentaerythritol tetranitrate, dicyclohexylammonium nitrite, and the like.

Specific examples of the materials for use as the antioxidant include phenol-based antioxidants (including hindered phenol-based antioxidants), amine-based antioxidants, phosphorous-containing antioxidants, and the like.

Specific examples of the materials for use as the ultraviolet absorbents include benzophenone-based ultraviolet absorbents, benzotriazol-based ultraviolet absorbents, salicylate-based ultraviolet absorbents, cyanoacrylate-based ultraviolet absorbents, nickel complex-based ultraviolet absorbents, and the like.

The term, "kogation" means a problem in that when a thermal inkjet recording head to eject droplets of an ink utilizing bubbles formed in the ink by heating the ink with a heater, through which a current is flown to generate heat, is used, the heated ink is degenerated and the degenerated ink is adhered to the heater. When kogation is caused, the ink cannot be satisfactorily heated by the heater, thereby weakening the ink ejection force of the recording head or causing a problem in the worst case in that the ink cannot be ejected by the recording head.

Specific examples of the materials for use as the kogation preventing agent include polyphosphoric acids, polyaminocarboxylic acids, aldonic acid, hydroxycarboxylic acids, phosphates of polyols, salts of these compounds, acids having an amino group and/or salts thereof, ammonium salts of acids havng a methyl group or a methylene group, and a carboxyl group, and the like.

The inkjet ink set of the present invention is preferably used for inkjet recording apparatus such as inkjet printers, inkjet facsimiles, inkjet copiers, and inkjet multifunctional products having printing/facsimileing/copying functions.

An inkjet recording apparatus, which uses the inkjet recording method of the present invention and which is used for evaluating the inks prepared in examples and comparative examples mentioned later, will be described by reference to FIGS. 1 and 2.

An inkjet recording apparatus illustrated in FIG. 1 has a main body 101, a recording material feed tray 102 on which a stack of recording material sheets is set and which is attached to the main body 101, a copy tray 103 on which the recording material sheets bearing images thereon are stacked, and an ink cartridge setting portion 104 to which ink cartridges 200 of the present invention are set. In addition, an operating portion 105 including operation keys and a display is provided on an upper surface of the ink cartridge setting portion 104. The ink cartridge setting portion 104 has a front cover 115 which is openable and closable so that the ink cartridges 200 can be attached thereto or detached therefrom. Numerals 111 and 112 denote an upper cover of the inkjet recording apparatus, and a front cover of the inkjet recording apparatus, respectively.

Next, the inside of the inkjet recording apparatus will be described by reference to FIG. 2.

The main body 101 includes a guide rod 131 and a stay 132, which are supported by both side walls of the main body 101 and which serve as guide members to guide a carriage 133 so as to freely slide (i.e., scan) in a main scanning direction. The scanning operation is performed by a main scanning motor.

A recording head 134 including four inkjet recording heads, each of which has multiple nozzles to eject droplets of yellow, magenta, cyan or black ink downward, is provided on the carriage 133.

Each of the four inkjet recording heads constituting the recording head 134 includes an energy generator to eject ink droplets. Specific examples of the energy generator include piezoelectric actuators (e.g., piezoelectric devices), thermal actuators to eject ink droplets utilizing phase change of ink by boiling a liquid film using an electrothermal device such as a resistor, a shape memory alloy actuator utilizing phase change of metal caused by temperature change, an electrostatic actuator utilizing electrostatic force, and the like.

In addition, sub-tanks 135 to supply the inks to the recording head 134 are provided on the carriage 133. The color inks and black ink in the ink cartridges 200 are supplied to the respective sub-tanks 135 via ink supplying tubes.

The inkjet recording apparatus includes a recording material supplier to feed recording material sheets 142 set on a loading portion 141, which is a pressing plate, toward an image recording area located below the recording head 134. The recording material supplier includes a semi-lunar feeding roller 143 to separately feed the recording material sheets 142 one by one, and a separation pad 144, which faces the feeding roller 143 while being biased toward the feeding roller 143 and which is made of a material having a high friction coefficient.

The inkjet recording apparatus further includes a feeder to feed the recording material sheet 142, which has been fed by the recording material supplier, toward the image recording area located below the recording head 134. The feeder includes a feeding belt 151 to feed the recording material sheet 142 while electrostatically attracting the sheet, a counter roller 152 to feed the recording material sheet 142, which is fed from the recording material supplier via a guide 145, while sandwiching the sheet 142 with the feeding belt 151, a direction changing guide 153 to change the direction of the recording material sheet 142, which is fed substantially vertically, at an angle of about 90° so that the recording material sheet 142 is contacted with the feeding belt 151 so as to be fed thereby, a pressing roller 155 which is biased toward the feeding belt 151 by a pressing member 154, and a charging roller 156 to charge the surface of the feeding belt 151.

The feeding belt 151 is an endless belt, which is tightly stretched by a feeding roller 157 and a tension roller 158 so as to be rotated in the feeding directions. For example, the feeding belt 151 consists of a first layer (i.e., uppermost layer), which serves as a sheet attracting surface of the feeding belt and which is made of a resin layer (such as a tetrafluoroethylene—ethylene copolymer (ETFE) whose electrostatic resistance is not controlled) with a thickness of about 40 μm, and a second layer (i.e., medium resistcance layer or grounding layer), which is made of almost the same material as that of the first layer except that carbon black is included therein so that the second layer has a medium electric resistance. In addition, a guide member 161 is arranged below the feeding belt 151 so as to face the recording area in which an image is recorded on the recording material sheet 142 by the recording head 134.

The inkjet recording apparatus further includes a sheet discharger to discharge the recording material sheet 142 bearing an image thereon from the main body 101. The sheet discharger includes a separation pick 171 to separate the recording material sheet 142 from the feeding belt 151, and discharging rollers 172 and 173 to discharge the recording material sheet 142 toward the copy tray 103.

A duplex copy unit 181 is detachably attached to the backside of the main body 101. The duplex copy unit 181 receives the recording material sheet 142, which is fed to the duplex copy unit by reversely rotating the feeding belt 151, and feeds again the recording material sheet 142 to the nip between the counter roller 152 and the feeding belt 151 so that another image is formed on the backside of the recording material sheet 142 by the recording head 134 in the recording area.

A manual sheet feeder 182, by which a recording material sheet can be manually fed to the inkjet recording apparatus, is provided above the duplex copy unit 181.

Next, the image forming operation of the inkjet recording apparatus will be described.

The recording material sheet 142 is supplied one by one by the recording material supplier. The recording material sheet 142 thus fed in substantially the vertical direction is guided by the guide 145 to the nip between the feeding belt 151 and the counter roller 152. The recording material sheet 142 is guided by the direction changing guide 153 so that the direction of the sheet is changed at an angle of about 90°. The recording material sheet 142 is then fed by the feeding belt 151 while pressed toward the feeding belt by the pressing roller 155.

Since the feeding belt 151 is charged by the charging roller 156, the recording material sheet 142 is fed by the feeding belt 151 while electrostatically adhered thereto. Next, the carriage 133 is moved in the main scanning direction while the recording head 134 is driven according to image signals so as to eject droplets of the inks to form a line of image on the surface of the recording material sheet 142, which is stopped in the image forming operation. After recording a line of image, the recording material sheet 142 is fed by a predetermined length, and the next image forming operation is performed to form another line of image on the surface of the recording material sheet 142. By repeating the image forming operation, an image is formed on the surface of the recording material sheet 142. When the inkjet recording apparatus receives a signal such that the image recording operation is completed or the rear edge of the recording material sheet 142 reaches the recording area, the image forming operation is stopped, and the recording material sheet 142 bearing the image thereon is discharged to the copy tray 103 by the sheet discharger.

When it is detected that the ink in the sub tank 135 is substantially exhausted, a predetermined amount of ink is supplied to the sub tank 135 from the corresponding ink cartridge 200.

In this inkjet recording apparatus, when the ink in the ink cartridge 200 is exhausted, it is possible that after the ink cartridge is disassembled, the ink bag in the ink cartridge is replaced with a new ink bag, and then the ink cartridge is assembled again to be attached to the inkjet recording apparatus.

Even when the ink cartridge 200 is set so as to be vertical from a front side of the inkjet recording apparatus as illustrated in FIG. 1, the ink in the ink cartridge 200 can be stably supplied to the corresponding sub tank 135. Therefore, even when the ink cartridge cannot be set from the upper side of the inkjet recording apparatus due to space limitation (for example, in a case where the apparatus is set in a rack or an object is set on the upper surface of the apparatus), the ink cartridge can be easily replaced.

This example of the inkjet recording apparatus is a serial (i.e., shuttle-type) inkjet recording apparatus, but the present invention can be applied not only to such serial inkjet recording apparatus, but also line inkjet recording apparatus having a line-form recording head.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Example 1

1. Preparation of Black Ink 1-K

The following components were mixed to prepare a dye solution.

| | |
|---|---|
| Dye having the below-mentioned formula (8) | 6.0 parts |
| Water-soluble solvent having the above-mentioned formula (1)-2 | 12.0 parts |
| 3-Methyl-1,3-butandiol | 35.0 parts |
| Antiseptic/fungicide (1,2-benzoisothiazoline-3-one, PROXEL LV from Avecia Ltd.) | 0.1 parts |
| Ion-exchange water | 46.9 parts |

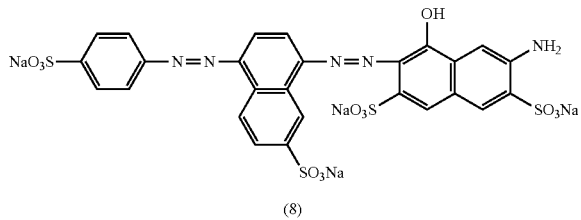

(8)

The dye solution was filtered with a filter having openings of 0.2 μm.

Thus, a black ink 1-K for inkjet recording was prepared.

2. Preparation of Cyan Ink 1-C

The procedure for preparation of the black ink 1-K was repeated except that the dye was replaced with 2.5 parts of a dye having the below-mentioned formula (9), and the added amount of 3-methyl-1,3-butandiol was changed to 47.0 parts.

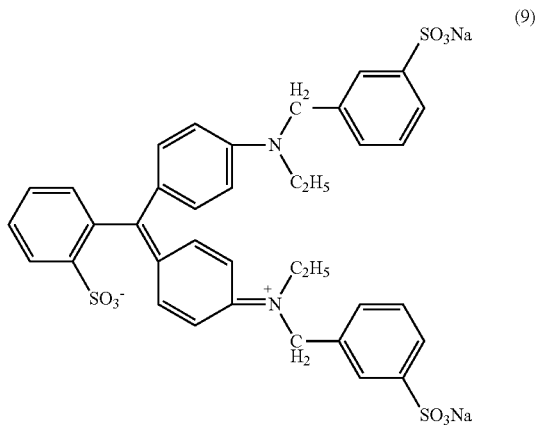

(9)

Thus, a cyan ink 1-C was prepared.

3. Preparation of Magenta Ink 1-M

The procedure for preparation of the cyan ink 1-C was repeated except that the dye was replaced with 2.0 parts of a dye having the following formula (10):

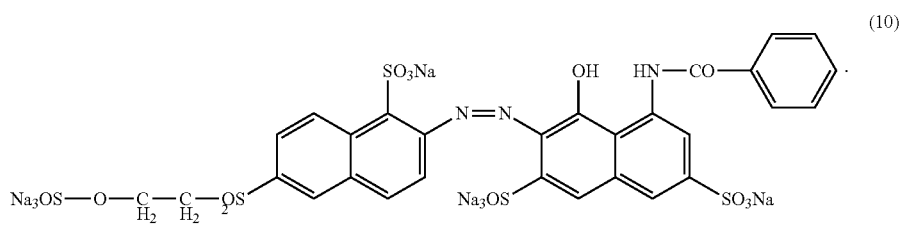

(10)

Thus, a magenta ink 1-M was prepared.

4. Preparation of Magenta Ink 1-Y

The procedure for preparation of the magenta ink 1-M was repeated except that the dye was replaced with 2.0 parts of a dye having the following formula (11):

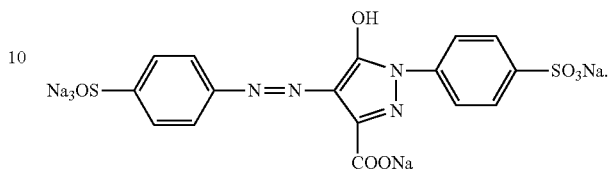

(11)

Thus, a yellow ink 1-Y was prepared.

Example 2

1. Preparation of Black Ink 2-K

The following components were mixed to prepare a dye solution.

| | |
|---|---|
| 20% aqueous solution of Direct Black 168 (DUASYN BLACK HEF-SF LIQUID from Clariant Japan K.K.) | 30.0 parts |
| Water-soluble solvent having the above-mentioned formula (1)-1 | 28.0 parts |
| Water-soluble solvent having the above-mentioned formula (1)-2 | 28.0 parts |
| Triethanolamine | 0.5 parts |
| Antiseptic/fungicide (1,2-benzoisothiazoline-3-one, PROXEL LV from Avecia Ltd.) | 0.1 parts |
| Ion-exchange water | 13.4 parts |

The dye solution was filtered with a filter having openings of 0.2 μm.

Thus, a black ink 2-K for inkjet recording was prepared.

2. Preparation of Cyan Ink 2-C

The procedure for preparation of the black ink 2-K was repeated except that the dye was replaced with 2.5 parts of a dye having the below-mentioned formula (7)-2, and each of the added amounts of the water-soluble solvents (1)-1 and (1)-2 was changed to 37.5 parts.

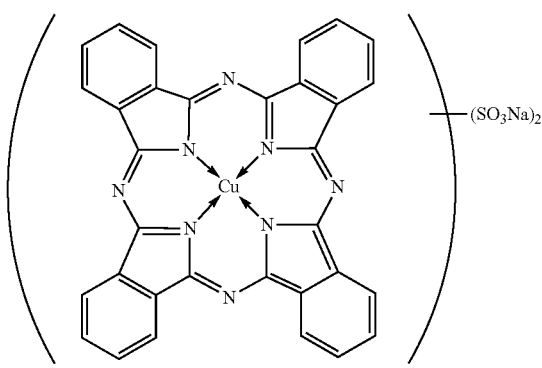

Thus, a cyan ink 2-C was prepared.

3. Preparation of Magenta Ink 2-M

The procedure for preparation of the cyan ink 2-C was repeated except that the dye was replaced with 2.0 parts of a dye having the following formula (6)-1:

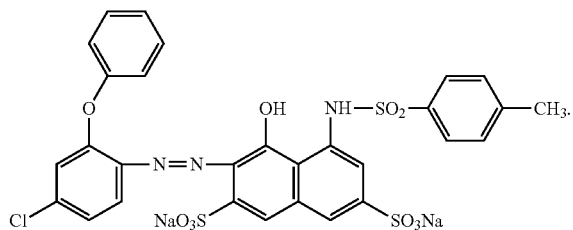

Thus, a magenta ink 2-M was prepared.

4. Preparation of Yellow Ink 2-Y

The procedure for preparation of the magenta ink 2-M was repeated except that the dye was replaced with 2.0 parts of a dye having the following formula (5)-1:

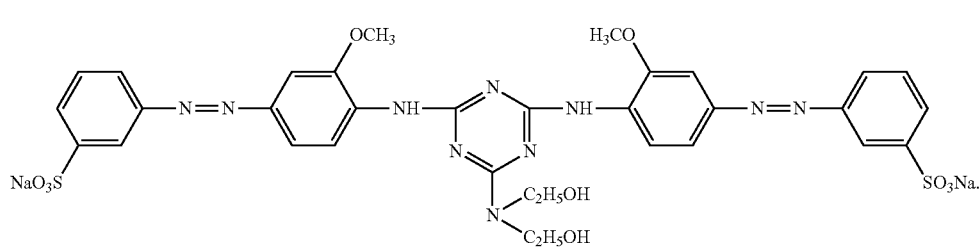

Thus, a yellow ink 2-Y was prepared.

Example 3

1. Preparation of Black Ink 3-K

The following components were mixed to prepare a dye solution.

| | |
|---|---:|
| 20% aqueous solution of Direct Black 168 | 30.0 parts |
| (DUASYN BLACK HEF-SF LIQUID from Clariant Japan) | |
| Water-soluble solvent having the above-mentioned formula (1)-1 | 15.0 parts |
| 1,3-Butanediol | 37.5 parts |
| 2,2,4-trimethyl-1,3-pentanediol | 2.0 parts |
| 2-amino-2-ethyl-1,3-propanediol | 0.5 parts |
| Antiseptic/fungicide | 0.1 parts |
| (1,2-benzoisothiazoline-3-one, PROXEL LV from Avecia Ltd.) | |
| Ion-exchange water | 14.9 parts |

The dye solution was filtered with a filter having openings of 0.2 μm.

Thus, a black ink 3-K was prepared.

2. Preparation of Cyan Ink 3-C

The procedure for preparation of the black ink 3-K was repeated except that the dye was replaced with 2.5 parts of a dye having the below-mentioned formula (7)-1, the added amount of the water-soluble solvent (1)-1 was changed to 20.0 parts, and the added amount of 1,3-butanediol was changed to 50.0 parts.

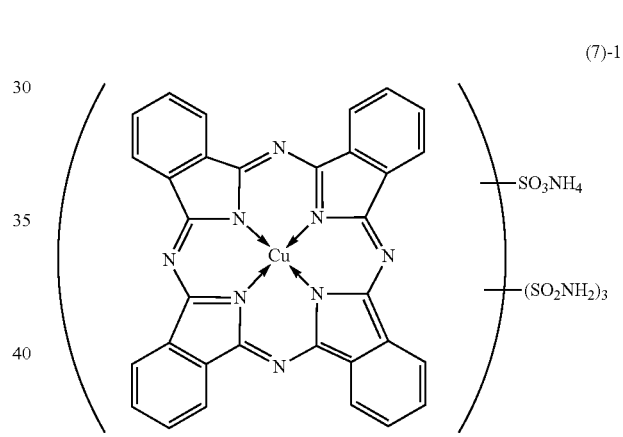

Thus, a cyan ink 3-C was prepared.

3. Preparation of Magenta Ink 3-M

The procedure for preparation of the cyan ink 3-C was repeated except that the dye was replaced with 2.0 parts of a dye having the above-mentioned formula (6)-1.

Thus, a magenta ink 3-M was prepared.

4. Preparation of Yellow Ink 3-Y

The procedure for preparation of the magenta ink 3-M was repeated except that the dye was replaced with a dye having the following formula (4)-1:

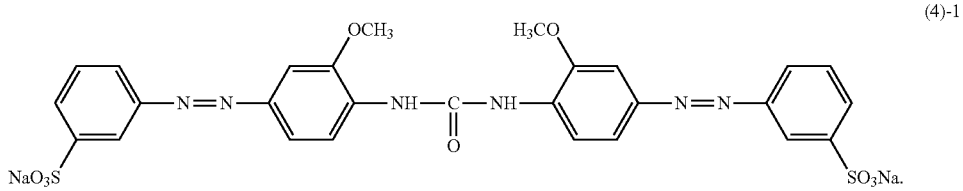

(4)-1

Thus, a yellow ink 3-Y was prepared.

Example 4

1. Preparation of Black Ink 4-K

The following components were mixed to prepare a dye solution.

| | |
|---|---|
| 30% black dye solution (BAYSCRIPT BLACK SP LIQUID from Lanxess AG) | 20.0 parts |
| Water-soluble solvent having the above-mentioned formula (1)-1 | 48.0 parts |
| Triethanolamine | 0.5 parts |
| Antiseptic/fungicide (1,2-benzoisothiazoline-3-one, PROXEL LV from Avecia Ltd.) | 0.1 parts |
| Ion-exchange water | 31.4 parts |

The dye solution was filtered with a filter having openings of 0.2 μm.

Thus, a black ink 4-K was prepared.

2. Preparation of Cyan Ink 4-C

The procedure for preparation of the black ink 4-K was repeated except that the dye was replaced with 2.5 parts of a dye having the above-mentioned formula (7)-1, and the added amount of the water-soluble solvent (1)-1 was changed to 59.5 parts.

Thus, a cyan ink 4-C was prepared.

3. Preparation of Magenta Ink 4-M

The procedure for preparation of the cyan ink 4-C was repeated except that the dye was replaced with 2.0 parts of a dye having the following formula (6)-2:

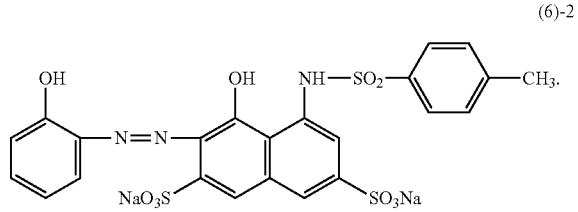

(6)-2

Thus, a magenta ink 4-M was prepared.

4. Preparation of Yellow Ink 4-Y

The procedure for preparation of the magenta ink 4-M was repeated except that the dye was replaced with 1.4 parts of a dye having the above-mentioned formula (4)-1 and 0.6 parts of a dye having the above-mentioned formula (5)-1.

Thus, a yellow ink 4-Y was prepared.

Example 5

1. Preparation of Black Ink 5-K

The following components were mixed to prepare a dye solution.

| | |
|---|---|
| Dye having the above-mentioned formula (8) | 9.0 parts |
| Water-soluble solvent having the above-mentioned formula (1)-1 | 10.0 parts |
| Water-soluble solvent having the above-mentioned formula (1)-2 | 10.0 parts |
| Glycerin | 10.0 parts |
| 2-Ethyl-3-hydroxymethyloxetane | 16.0 parts |
| 2-Ethyl-1,3-hexanediol | 2.0 parts |
| 2-Amino-2-ethyl-1,3-propanediol | 0.3 parts |
| Antiseptic/fungicide (1,2-benzoisothiazoline-3-one, PROXEL LV from Avecia Ltd.) | 0.1 parts |
| Ion-exchange water | 42.6 parts |

The dye solution was filtered with a filter having openings of 0.2 μm.

Thus, a black ink 5-K was prepared.

1. Preparation of Cyan Ink 5-C

The following components were mixed to prepare a dye solution.

| | |
|---|---|
| Dye having the above-mentioned formula (7)-1 | 4.5 parts |
| Water-soluble solvent having the above-mentioned formula (1)-1 | 12.0 parts |
| Water-soluble solvent having the above-mentioned formula (1)-2 | 12.0 parts |
| Glycerin | 15.0 parts |
| 3-Methyl-1,3-butandiol | 20.0 parts |
| 2-Ethyl-1,3-hexanediol | 2.0 parts |
| 2-Amino-2-ethyl-1,3-propanediol | 0.3 parts |
| Antiseptic/fungicide (1,2-benzoisothiazoline-3-one, PROXEL LV from Avecia Ltd.) | 0.1 parts |
| Ion-exchange water | 34.1 parts |

The dye solution was filtered with a filter having openings of 0.2 μm.

Thus, a cyan ink 5-C was prepared.

3. Preparation of Magenta Ink 5-M

The procedure for preparation of the cyan ink 5-C was repeated except that the dye was replaced with 4.0 parts of a dye having the above-mentioned formula (6)-1.

Thus, a magenta ink 5-M was prepared.

4. Preparation of Yellow Ink 5-Y

The procedure for preparation of the magenta ink 5-M was repeated except that the dye was replaced with 4.5 parts of a dye having the above-mentioned formula (4)-1.

Thus, a yellow ink 5-Y was prepared.

Example 6

1. Preparation of Black Ink 6-K

The following components were mixed to prepare a dye solution.

| | |
|---|---|
| 20% aqueous solution of Direct Black 168 (DUASYN BLACK HEF-SF LIQUID from Clariant Japan) | 45.0 parts |
| Water-soluble solvent having the above-mentioned formula (1)-1 | 14.0 parts |
| Glycerin | 14.0 parts |
| 3-Methyl-1,3-butanediol | 24.0 parts |
| Penetrant having the above-mentioned formula (2)-1 | 0.1 parts |
| 2-Amino-2-ethyl-1,3-propanediol | 0.2 parts |
| Antiseptic/fungicide (1,2-benzoisothiazoline-3-one, PROXEL LV from Avecia Ltd.) | 0.1 parts |
| Ion-exchange water | 2.6 parts |

The dye solution was filtered with a filter having openings of 0.2 μm.

Thus, a black ink 6-K was prepared.

2. Preparation of Cyan Ink 6-C

The procedure for preparation of the black ink 6-K was repeated except that the dye was replaced with 4.5 parts of a dye having the above-mentioned formula (7)-2, 3-methyl-1,3-butanediol was replaced with 1,3-butanediol, and 14.0 parts of 3-ethyl-3-hydroxymethyloxetane was added.

Thus, a cyan ink 6-C was prepared.

3. Preparation of Magenta Ink 4-M

The procedure for preparation of the cyan ink 6-C was repeated except that the dye was replaced with 4.0 parts of a dye having the above-mentioned formula (6)-1.

Thus, a magenta ink 6-M was prepared.

4. Preparation of Yellow Ink 6-Y

The procedure for preparation of the magenta ink 6-M was repeated except that the dye was replaced with 4.5 parts of a dye having the above-mentioned formula (5)-1.

Thus, a yellow ink 6-Y was prepared.

Example 7

1. Preparation of Black Ink 7-K

The following components were mixed to prepare a dye solution.

| | |
|---|---|
| 30% black dye solution (BAYSCRIPT BLACK SP LIQUID from Lanxess AG) | 25.0 parts |
| Water-soluble solvent having the above-mentioned formula (1)-1 | 20.0 parts |
| Water-soluble solvent having the above-mentioned formula (1)-2 | 28.0 parts |
| Penetrant having the above-mentioned formula (2)-1 | 0.1 parts |
| Penetrant having the above-mentioned formula (3)-1 | 0.05 parts |
| Triethanolamine | 0.3 parts |
| Antiseptic/fungicide (1,2-benzoisothiazoline-3-one, PROXEL LV from Avecia Ltd.) | 0.1 parts |
| Ion-exchange water | 26.45 parts |

The dye solution was filtered with a filter having openings of 0.2 μm.

Thus, a black ink 7-K was prepared.

2. Preparation of Cyan Ink 7-C

The procedure for preparation of the black ink 7-K was repeated except that the dye was replaced with 3.0 parts of a dye having the above-mentioned formula (7)-1, and the added amounts of the water-soluble solvents (1)-1 and (1)-2 were changed to 25.0 parts and 34.0 parts, respectively.

Thus, a cyan ink 7-C was prepared.

3. Preparation of Magenta Ink 7-M

The procedure for preparation of the cyan ink 7-C was repeated except that the dye was replaced with 2.5 parts of a dye having the above-mentioned formula (6)-2.

Thus, a magenta ink 7-M was prepared.

4. Preparation of Yellow Ink 7-Y

The procedure for preparation of the magenta ink 7-M was repeated except that the dye was replaced with 1.5 parts of a dye having the above-mentioned formula (4)-1 and 1.0 part of a dye having the above-mentioned formula (5)-1.

Thus, a yellow ink 7-Y was prepared.

Example 8

1. Preparation of Black Ink 8-K

The following components were mixed to prepare a dye solution.

| | |
|---|---|
| 20% aqueous solution of Direct Black 168 (DUASYN BLACK HEF-SF LIQUID from Clariant Japan) | 37.5 parts |
| Water-soluble solvent having the above-mentioned formula (1)-1 | 15.0 parts |
| Water-soluble solvent having the above-mentioned formula (1)-2 | 10.0 parts |
| Glycerin | 10.0 parts |
| 1,3-Butanediol | 15.0 parts |
| 2-Ethyl-1,3-hexanediol | 1.5 parts |
| Penetrant having formula (2)-1 | 0.1 parts |
| Penetrant having the above-mentioned formula (3)-1 | 0.02 parts |
| 2-Amino-2-ethyl-1,3-propanediol | 0.5 parts |
| Antiseptic/fungicide (1,2-benzoisothiazoline-3-one, PROXEL LV from Avecia Ltd.) | 0.1 parts |
| Ion-exchange water | 10.28 parts |

The dye solution was filtered with a filter having openings of 0.2 μm.

Thus, a black ink 8-K was prepared.

2. Preparation of Cyan Ink 8-C

The procedure for preparation of the black ink 8-K was repeated except that the dye was replaced with 3.0 parts of a dye having the above-mentioned formula (7)-1, and the added amounts of the water-soluble solvents (1)-1 and (1)-2 and 1,3-butanediol were changed to 20.0 parts, 15 parts and 20.0 parts, respectively.

Thus, a cyan ink 8-C was prepared.

3. Preparation of Magenta Ink 8-M

The procedure for preparation of the cyan ink 8-C was repeated except that the dye was replaced with 2.5 parts of a dye having the above-mentioned formula (6)-1.

Thus, a magenta ink 8-M was prepared.

4. Preparation of Yellow Ink 8-Y

The procedure for preparation of the magenta ink 8-M was repeated except that the dye was replaced with 2.5 parts of a dye having the above-mentioned formula (4)-1.

Thus, a yellow ink 8-Y was prepared.

Example 9

The inkjet ink set of Example 9 consisted of the black ink 7-K, the cyan ink 2-C, the magenta ink 8-M and the yellow ink 5-Y.

Comparative Example 1

1. Preparation of Black Ink 10-K

The procedure for preparation of the black ink 3-K was repeated except that 15.0 parts of the water-soluble solvent having formula (1)-1 was replaced with 17.5 parts of glycerin, and the added amount of ion-exchange water was reduced by 2.5 parts.

Thus, a black ink 10-K was prepared.

2. Preparation of Cyan, Magenta and Yellow Inks 10-C, 10-M and 10-Y

The procedure for preparation of the cyan, magenta and yellow inks 3-C, 3-M and 3-Y was repeated except that 20.0 parts of the water-soluble solvent having formula (1)-1 was replaced with 24.5 parts of glycerin, and the added amount of ion-exchange water was reduced by 9.5 parts.

Thus, cyan, magenta and yellow inks 10-C, 10-M and 10-Y were prepared.

Comparative Example 2

1. Preparation of Black Ink 11-K

The procedure for preparation of the black ink 8-K was repeated except that the added amount (15.0 parts) of the water-soluble solvent having formula (1)-1 was changed to 10.0 parts, and the added amount of ion-exchange water was increased by 5.0 parts.

Thus, a black ink 11-K was prepared.

2. Preparation of Cyan, Magenta and Yellow Inks 11-C, 11-M and 11-Y

The procedure for preparation of the cyan, magenta and yellow inks 8-C, 8-M and 8-Y was repeated except that the added amount (20.0 parts) of the water-soluble solvent having formula (1)-1 was changed to 11.5 parts, and the added amount of ion-exchange water was increased by 8.5 parts.

Thus, cyan, magenta and yellow inks 11-C, 11-M and 11-Y were prepared.

Comparative Example 3

1. Preparation of Black Ink 12-K

The procedure for preparation of the black ink 7-K was repeated except that the added amount (20.0 parts) of the water-soluble solvent having formula (1)-1 was changed to 34.0 parts, and the added amount of ion-exchange water was reduced by 14.0 parts.

Thus, a black ink 12-K was prepared.

2. Preparation of Cyan, Magenta and Yellow Inks 12-C, 12-M and 12-Y

The procedure for preparation of the cyan, magenta and yellow inks 7-C, 7-M and 7-Y was repeated except that the added amount (25.0 parts) of the water-soluble solvent having formula (1)-1 was changed to 44.0 parts, and the added amount of ion-exchange water was reduced by 19.0 parts.

Thus, cyan, magenta and yellow inks 12-C, 12-M and 12-Y were prepared.

Comparative Example 4

1. Preparation of Black Ink 13-K

The procedure for preparation of the black ink 6-K was repeated except that the added amount (24.0 parts) of 3-methyl-1,3-butanediol was changed to 17.0 parts, and the added amount of ion-exchange water was increased by 7.0 parts.

Thus, a black ink 13-K was prepared.

2. Preparation of Cyan Ink 13-C

The procedure for preparation of the cyan ink 8-C was repeated except that the added amount (10.0 parts) of glycerin was changed to 19.0 parts, and the added amount of ion-exchange water was reduced by 9.0 parts.

Thus, a cyan ink 13-C was prepared.

3. Preparation of Magenta Ink 13-M

The procedure for preparation of the magenta ink 5-M was repeated except that the added amount (12.0 parts) of each of the water-soluble solvents (1)-1 and (1)-2 was changed to 19.0 parts, and the added amount of ion-exchange water was reduced by 14.0 parts.

Thus, a magenta ink 13-M was prepared.

4. Preparation of Yellow Ink 13-Y

The procedure for preparation of the yellow ink 3-Y was repeated except that the added amount (50.0 parts) of 1,3-butanediol was changed to 36.0 parts, and the added amount of ion-exchange water was increased by 14.0 parts.

Thus, a yellow ink 13-Y was prepared.

The thus prepared inkjet ink sets of Examples 1-9 and Comparative Examples 1-4 were evaluated with respect to the following properties.

(1) Viscosity

The viscosity of each ink was measured with a rotary viscometer RE-80L from Toki Sangyo Co., Ltd. under the following conditions.

Cone used: 1.34°×R24
Amount of sample: 1.2 ml
Revolution of cone: 50 rpm
Measuring time: at a time 3 minutes after start of rotation of cone
Temperature: 25° C.

(2) Flash Point

The flash point of each ink was measured by a Cleveland open flash point measuring method, which is described in JIS K-2265.

(3) Ejection Stability

Figure 2:
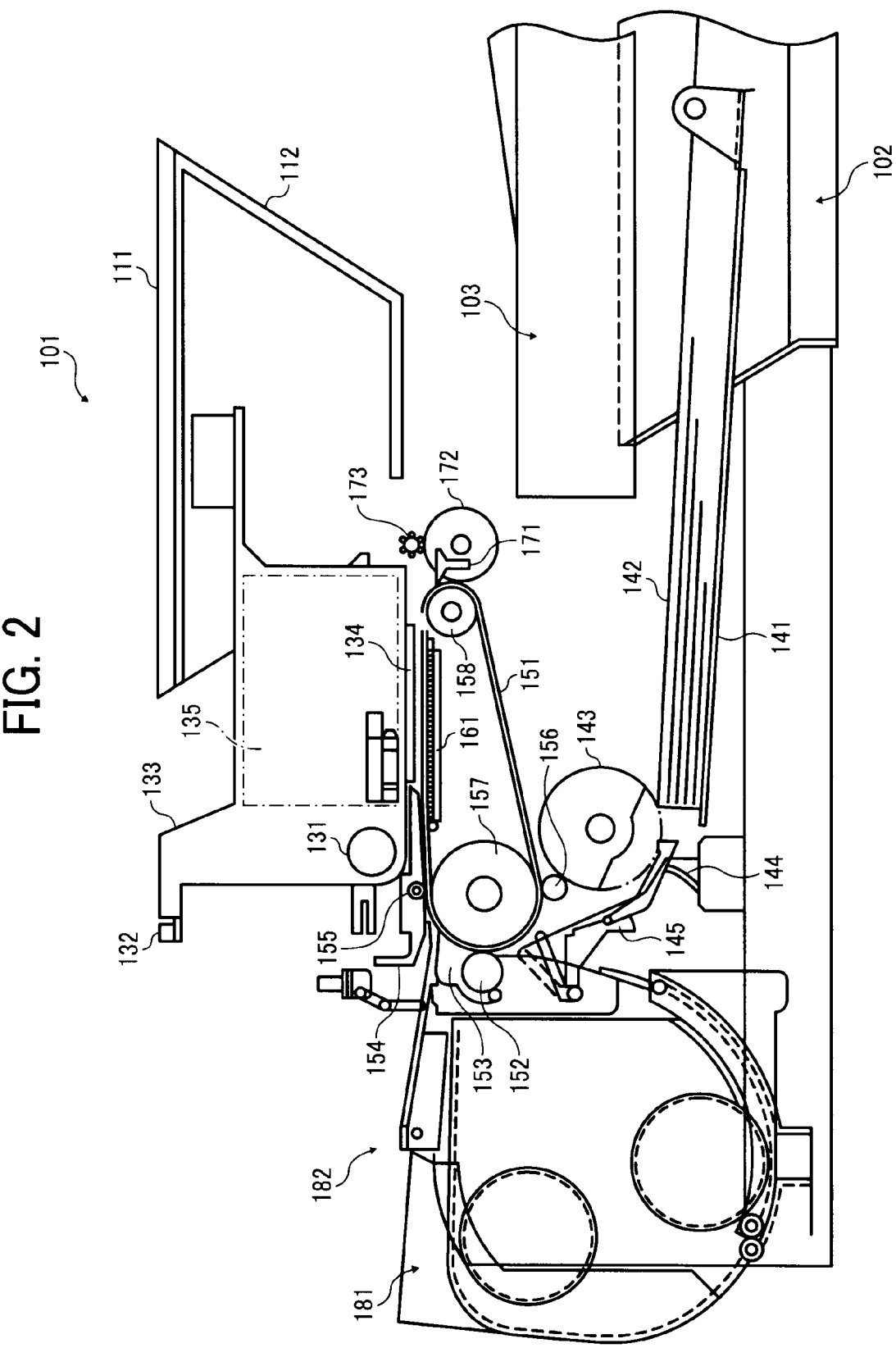
FIG. 2 is a schematic cross-sectional view illustrating the structure of the inkjet recording apparatus illustrated in FIG. 1.

Each ink was set in an inkjet printer IPSIO GX5000 from Ricoh Co., Ltd., which has such a structure as illustrated in FIGS. 1 and 2.

Initially, images were continuously printed for 10 minutes, and the surface of the recording head, to which the inks (i.e., residual inks) were adhered, was covered with a moisturizing cap. After the printer was allowed to settle for 1 month under conditions of 50° C. and 60% RH, the recording head was cleaned to remove the residual inks therefrom, the ink was subjected to the following intermittent image forming test.

Specifically, twenty (20) copies of an original image having an image area proportion of 5% were continuously produced by the inkjet printer, and then the copying operation was stopped for 20 minutes. After this intermittent image forming operation was repeated 50 times to produce 1,000 copies, one copy of the original image was produced, and the solid images in the copy were visually observed to determine whether the solid images have a streak image, a white spot, and a distorted image due to deficient ejection of the ink.

In this regard, the recording conditions of the printer were as follows.

Duty for ink: 100%
Record density: 600×300 dpi
Recording method: One-pass recording method (i.e., image recording is performed when the recording head moves forward)

The ejection stability property of the inks was graded as follows.

A: The solid images have no streak image, white spot and distorted image. (Good)
B: The solid images have slight streak image, white spot and distorted image. (Acceptable)
C: The solid images have a streak image, a white spot and a distorted image. (Unacceptable)
D: Streak images, white spots and distorted images are observed on the entire solid images. (Bad)

(4) Curl

After each ink was set in an inkjet printer IPSIO GX5000 from Ricoh Co., Ltd., a solid image was formed on the entire surface of one side of each of A4-size plain papers (a) (i.e., BP-PAPER GF-500 from Canon Inc.) and (b) (MYRECYCLE PAPER 100 from Ricoh Co., Ltd.) under the following recording conditions.

Record density: 600×300 dpi
Recording method: One-pass recording method
Weight of the solid image: 300 to 340 mg/A4 size At a time 10 minutes after formation of the copy, the copy was set on a flat table so that the solid image faces the surface of the table, and the heights (i.e., curl) of both the side ends of the copy were measured with a scale, followed by averaging the two height data to determine the curl of the copy.

The curl imparting property of the inks was graded as follows.

A: The curl is less than 5 mm. (Good)
B: The curl is not less than 5 mm and less than 20 mm. (Acceptable)
C: The curl is not less than 20 mm and less than 50 mm. (Unacceptable)
D: The copy has a cylindrical form. (Bad)

The curl is preferably less than 20 mm.

(5) Penetration of Ink

A solid image was formed on each of the plain papers (a) and (b) by the method mentioned above in paragraph (4). The optical density of the backsides of the copies was measured with a reflection type spectrophotometric densitometer from X-Rite Inc.

The penetration property of the inks was graded as follows.

A: The optical density is less than 0.1. (Good)
B: The optical density is not less than 0.1 and less than 0.2. (Acceptable)
C: The optical density is not less than 0.2 and less than 0.4. (Unacceptable)
D: The optical density is not less than 0.4. (Bad)

The optical density is preferably less than 0.2.

(6) Color Bleeding

A set of inks (i.e., yellow, magenta, cyan and black inks) was set in the printer mentioned above, and an image in which a black character image is formed on each of magenta, cyan and yellow solid images was produced on the plain paper (b) under the following conditions.

Duty for ink: 100%
Record density: 600×300 dpi
Recording method: One-pass recording method The image was visually observed to determine whether there is bleeding between the black character image and the color solid images.

The color bleeding property of the color inks was graded as follows.

A: There is no color bleeding, and the black character image can be clearly observed. (Good)
B: There is slight color bleeding, and the black character image slightly blurs. (Acceptable)
C: There is color bleeding, and the black character image blurs but can be read. (Unacceptable)
D: There is color bleeding, and the black character image blurs to such an extent as not to be read. (Bad)

The color bleeding property of the color inks is preferably grade A or B.

The formulae of the inks are shown in Tables 1-1 to 1-7 below.

TABLE 1-1

|  |  | Example 1 | | | | Example 2 | | | |
| --- | --- | --- | --- | --- | --- | --- | --- | --- | --- |
|  |  | 1-K | 1-C | 1-M | 1-Y | 2-K | 2-C | 2-M | 2-Y |
| Dye | Dye used | (8) | (9) | (10) | (11) | HEF-SF | (7)-2 | (6)-1 | (5)-1 |
|  | Conc. | 6.0 | 2.5 | 2.0 | 2.0 | 6.0 | 2.5 | 2.0 | 2.0 |
| Water soluble | (1)-1 |  |  |  |  | 28.0 | 37.5 | 37.5 | 37.5 |

TABLE 1-1-continued

|  |  | Example 1 | | | | Example 2 | | | |
| --- | --- | --- | --- | --- | --- | --- | --- | --- | --- |
|  |  | 1-K | 1-C | 1-M | 1-Y | 2-K | 2-C | 2-M | 2-Y |
| solvent | (1)-2 | 12.0 | 12.0 | 12.0 | 12.0 | 28.0 | 37.5 | 37.5 | 37.5 |
|  | GLY |  |  |  |  |  |  |  |  |
|  | MBD | 35.0 | 47.0 | 47.0 | 47.0 |  |  |  |  |
|  | 13BD |  |  |  |  |  |  |  |  |
|  | EHO |  |  |  |  |  |  |  |  |
|  | 2E13HD |  |  |  |  |  |  |  |  |
|  | 224TM13PD |  |  |  |  |  |  |  |  |
| Penetrant | (2)-1 |  |  |  |  |  |  |  |  |
|  | (3)-1 |  |  |  |  |  |  |  |  |
| pH controlling agent | TEA |  |  |  |  | 0.5 | 0.5 | 0.5 | 0.5 |
|  | AEPD |  |  |  |  |  |  |  |  |
| Antiseptic/ fungicide | PROXEL LV | 0.1 | 0.1 | 0.1 | 0.1 | 0.1 | 0.1 | 0.1 | 0.1 |

Note:
Abbreviations means as follows.
HEF-SF: DUASYN BLACK HEF-SF LIQUID
GLY: Glycerin
MBD: 3-methyl-1,3-butanediol
EHO: 3-ethyl-3-hydroxymethyloxetane
2E13HD: 2-ethyl-1,3-hexanediol
224TM13PD: 2,2,4-trimethyl-1,3-pentanediol
TEM: Triethanolamine
AEPD: 2-amino-2-ethyl-1,3-propanediol
LV: PROXEL LV (1,2-benzoisothiazoline-3-one)

TABLE 1-2

|  |  | Example 3 | | | | Example 4 | | | |
| --- | --- | --- | --- | --- | --- | --- | --- | --- | --- |
|  |  | 3-K | 3-C | 3-M | 3-Y | 4-K | 4-C | 4-M | 4-Y |
| Dye | Dye used | HEF-SF | (7)-1 | (6)-1 | (4)-1 | BP | (7)-1 | (6)-2 | (4)-1, (5)-1 |
|  | Conc. | 6.0 | 2.5 | 2.0 | 2.0 | 6.0 | 2.5 | 2.0 | 1.4, 0.6 |
| Water soluble solvent | (1)-1 |  |  |  |  |  |  |  |  |
|  | (1)-2 | 15.0 | 20.0 | 20.0 | 20.0 | 48.0 | 59.5 | 59.5 | 59.5 |
|  | GLY |  |  |  |  |  |  |  |  |
|  | MBD |  |  |  |  |  |  |  |  |
|  | 13BD | 37.5 | 50.0 | 50.0 | 50.0 |  |  |  |  |
|  | EHO |  |  |  |  |  |  |  |  |
|  | 2E13HD |  |  |  |  |  |  |  |  |
|  | 224TM13PD | 2.0 | 2.0 | 2.0 | 2.0 |  |  |  |  |
| Penetrant | (2)-1 |  |  |  |  |  |  |  |  |
|  | (3)-1 |  |  |  |  |  |  |  |  |
| pH controlling agent | TEA |  |  |  |  | 0.5 | 0.5 | 0.5 | 0.5 |
|  | AEPD | 0.5 | 0.5 | 0.5 | 0.5 |  |  |  |  |
| Antiseptic/ fungicide | PROXEL LV | 0.1 | 0.1 | 0.1 | 0.1 | 0.1 | 0.1 | 0.1 | 0.1 |

Note:
Abbreviations means as follows.
BP: BAYSCRIPT BLACK SP LIQUID

TABLE 1-3

|  |  | Example 5 | | | | Example 6 | | | |
| --- | --- | --- | --- | --- | --- | --- | --- | --- | --- |
|  |  | 5-K | 5-C | 5-M | 5-Y | 6-K | 6-C | 6-M | 6-Y |
| Dye | Dye used | (8) | (7)-1 | (6)-1 | (4)-1 | HEF-SF | (7)-2 | (6)-1 | (5)-1 |
|  | Conc. | 9.0 | 4.5 | 4.0 | 4.5 | 9.0 | 4.5 | 4.0 | 4.5 |
| Water soluble solvent | (1)-1 | 10.0 | 12.0 | 12.0 | 12.0 | 14.0 | 14.0 | 14.0 | 14.0 |
|  | (1)-2 | 10.0 | 12.0 | 12.0 | 12.0 |  |  |  |  |
|  | GLY | 10.0 | 15.0 | 15.0 | 15.0 | 14.0 | 14.0 | 14.0 | 14.0 |
|  | MBD |  | 20.0 | 20.0 | 20.0 | 24.0 |  |  |  |
|  | 13BD |  |  |  |  |  | 24.0 | 24.0 | 24.0 |
|  | EHO | 16.0 |  |  |  |  | 14.0 | 14.0 | 14.0 |
|  | 2E13HD | 2.0 | 2.0 | 2.0 | 2.0 |  |  |  |  |
|  | 224TM13PD |  |  |  |  |  |  |  |  |

TABLE 1-3-continued

|  |  | Example 5 | | | | Example 6 | | | |
| --- | --- | --- | --- | --- | --- | --- | --- | --- | --- |
|  |  | 5-K | 5-C | 5-M | 5-Y | 6-K | 6-C | 6-M | 6-Y |
| Penetrant | (2)-1 |  |  |  |  | 0.1 | 0.1 | 0.1 | 0.1 |
|  | (3)-1 |  |  |  |  |  |  |  |  |
| pH controlling agent | TEA |  |  |  |  |  |  |  |  |
|  | AEPD | 0.3 | 0.3 | 0.3 | 0.3 | 0.2 | 0.2 | 0.2 | 0.2 |
| Antiseptic/ fungicide | PROXEL LV | 0.1 | 0.1 | 0.1 | 0.1 | 0.1 | 0.1 | 0.1 | 0.1 |

TABLE 1-4

|  |  | Example 7 | | | | Example 8 | | | |
| --- | --- | --- | --- | --- | --- | --- | --- | --- | --- |
|  |  | 7-K | 7-C | 7-M | 7-Y | 8-K | 8-C | 8-M | 8-Y |
| Dye | Dye used | SP | (7)-1 | (6)-2 | (4)-1, (5)-1 | HEF-SF | (7)-1 | (6)-1 | (4)-1 |
|  | Conc. | 7.5 | 3.0 | 2.5 | 1.5, 1.0 | 7.5 | 3.0 | 2.5 | 2.5 |
| Water soluble solvent | (1)-1 | 20.0 | 25.0 | 25.0 | 25.0 | 15.0 | 20.0 | 20.0 | 20.0 |
|  | (1)-2 | 28.0 | 34.0 | 34.0 | 34.0 | 10.0 | 15.0 | 15.0 | 15.0 |
|  | GLY |  |  |  |  | 10.0 | 10.0 | 10.0 | 10.0 |
|  | MBD |  |  |  |  |  |  |  |  |
|  | 13BD |  |  |  |  | 15.0 | 20.0 | 20.0 | 20.0 |
|  | EHO |  |  |  |  |  |  |  |  |
|  | 2E13HD |  |  |  |  | 1.5 | 1.5 | 1.5 | 1.5 |
|  | 224TM13PD |  |  |  |  |  |  |  |  |
| Penetrant | (2)-1 | 0.1 | 0.1 | 0.1 | 0.1 | 0.1 | 0.1 | 0.1 | 0.1 |
|  | (3)-1 | 0.05 | 0.05 | 0.05 | 0.05 | 0.02 | 0.02 | 0.02 | 0.02 |
| pH controlling agent | TEA | 0.3 | 0.3 | 0.3 | 0.3 |  |  |  |  |
|  | AEPD |  |  |  |  | 0.5 | 0.5 | 0.5 | 0.5 |
| Antiseptic/ fungicide | PROXEL LV | 0.1 | 0.1 | 0.1 | 0.1 | 0.1 | 0.1 | 0.1 | 0.1 |

TABLE 1-5

|  |  | Example 9 | | | | Comparative Example 1 | | | |
| --- | --- | --- | --- | --- | --- | --- | --- | --- | --- |
|  |  | 7-K | 2-C | 8-M | 5-Y | 10-K | 10-C | 10-M | 10-Y |
| Dye | Dye used | SP | (7)-2 | (6)-1 | (4)-1 | HEF-SF | (7)-1 | (6)-1 | (4)-1 |
|  | Conc. | 7.5 | 2.5 | 2.5 | 4.5 | 6.0 | 2.5 | 2.0 | 2.0 |
| Water soluble solvent | (1)-1 | 20.0 | 37.5 | 20.0 | 12.0 |  |  |  |  |
|  | (1)-2 | 28.0 | 37.5 | 15.0 | 12.0 |  |  |  |  |
|  | GLY |  |  | 10.0 | 15.0 | 17.5 | 24.5 | 24.5 | 24.5 |
|  | MBD |  |  |  | 20.0 |  |  |  |  |
|  | 13BD |  |  | 20.0 |  | 37.5 | 50.0 | 50.0 | 50.0 |
|  | EHO |  |  |  |  |  |  |  |  |
|  | 2E13HD |  |  | 1.5 | 2.0 |  |  |  |  |
|  | 224TM13PD |  |  |  |  | 2.0 | 2.0 | 2.0 | 2.0 |
| Penetrant | (2)-1 | 0.1 |  | 0.1 |  |  |  |  |  |
|  | (3)-1 | 0.05 |  | 0.02 |  |  |  |  |  |
| pH controlling agent | TEA | 0.3 | 0.5 |  |  |  |  |  |  |
|  | AEPD |  |  | 0.5 | 0.3 | 0.5 | 0.5 | 0.5 | 0.5 |
| Antiseptic/ fungicide | PROXEL LV | 0.1 | 0.1 | 0.1 | 0.1 | 0.1 | 0.1 | 0.1 | 0.1 |

;l

TABLE 1-6

|  |  | Comparative Example 2 | | | | Comparative Example 3 | | | |
| --- | --- | --- | --- | --- | --- | --- | --- | --- | --- |
|  |  | 11-K | 11-C | 11-M | 11-Y | 12-K | 12-C | 12-M | 12-Y |
| Dye | Dye used | HEF-SF | (7)-1 | (6)-1 | (4)-1 | SP | (7)-1 | (6)-2 | (4)-1, (5)-1 |
|  | Conc. | 6.0 | 2.5 | 2.0 | 2.0 | 7.5 | 3.0 | 2.5 | 1.5, 1.0 |
| Water soluble | (1)-1 | 10.0 | 11.5 | 11.5 | 11.5 | 34.0 | 44.0 | 44.0 | 44.0 |

TABLE 1-6-continued

|  |  | Comparative Example 2 | | | | Comparative Example 3 | | | |
| --- | --- | --- | --- | --- | --- | --- | --- | --- | --- |
|  |  | 11-K | 11-C | 11-M | 11-Y | 12-K | 12-C | 12-M | 12-Y |
| solvent | (1)-2 | 10.0 | 15.0 | 15.0 | 15.0 | 28.0 | 34.0 | 34.0 | 34.0 |
|  | GLY | 10.0 | 10.0 | 10.0 | 10.0 |  |  |  |  |
|  | MBD |  |  |  |  |  |  |  |  |
|  | 13BD | 15.0 | 20.0 | 20.0 | 20.0 |  |  |  |  |
|  | EHO |  |  |  |  |  |  |  |  |
|  | 2E13HD | 1.5 | 1.5 | 1.5 | 1.5 |  |  |  |  |
|  | 224TM13PD |  |  |  |  |  |  |  |  |
| Penetrant | (2)-1 | 0.1 | 0.1 | 0.1 | 0.1 | 0.1 | 0.1 | 0.1 | 0.1 |
|  | (3)-1 | 0.02 | 0.02 | 0.02 | 0.02 | 0.05 | 0.05 | 0.05 | 0.05 |
| pH controlling agent | TEA |  |  |  |  | 0.3 | 0.3 | 0.3 | 0.3 |
|  | AEPD | 0.5 | 0.5 | 0.5 | 0.5 |  |  |  |  |
| Antiseptic/fungicide | PROXEL LV | 0.1 | 0.1 | 0.1 | 0.1 | 0.1 | 0.1 | 0.1 | 0.1 |

TABLE 1-7

|  |  | Comparative Example 4 | | | |
| --- | --- | --- | --- | --- | --- |
|  |  | 13-K | 13-C | 13-M | 13-Y |
| Dye | Dye used | HEF-SF | (7)-1 | (6)-1 | (4)-1 |
|  | Conc. | 9.0 | 3.0 | 4.0 | 2.0 |
| Water soluble solvent | (1)-1 | 14.0 | 20.0 | 19.0 | 20.0 |
|  | (1)-2 |  | 15.0 | 19.0 |  |
|  | GLY | 14.0 | 19.0 | 15.0 |  |
|  | MBD | 17.0 |  |  | 20.0 |
|  | 13BD |  | 20.0 |  | 36.0 |
|  | EHO |  |  |  |  |
|  | 2E13HD |  | 1.5 | 2.0 |  |
|  | 224TM13PD |  |  |  | 2.0 |
| Penetrant | (2)-1 |  | 0.1 | 0.1 |  |
|  | (3)-1 |  |  | 0.02 |  |
| pH controlling agent | TEA |  |  |  |  |
|  | AEPD | 0.2 | 0.5 | 0.3 | 0.5 |
| Antiseptic/fungicide | PROXEL LV | 0.1 | 0.1 | 0.1 | 0.1 |

The evaluation results are shown in Tables 2-1 and 2-2 below.

TABLE 2-1

|  | Ink | Amount of water-soluble solvent (S) (%) | Amount of water (W)* (%) | S/W | Flash point (° C.) | Viscosity (mPa·s) | Ejection stability |
| --- | --- | --- | --- | --- | --- | --- | --- |
| Ex. 1 | 1-K | 47.0 | 46.9 | 1.002 | No | 21.4 | B |
|  | 1-C | 59.0 | 38.4 | 1.536 | No | 22.2 | B |
|  | 1-M | 59.0 | 38.9 | 1.517 | No | 20.8 | B |
|  | 1-Y | 59.0 | 38.9 | 1.517 | No | 21.1 | B |
| Ex. 2 | 2-K | 56.0 | 37.4 | 1.497 | No | 7.6 | A |
|  | 2-C | 75.0 | 21.9 | 3.425 | No | 7.8 | A |
|  | 2-M | 75.0 | 22.4 | 3.348 | 98 | 7.7 | A |
|  | 2-Y | 75.0 | 22.4 | 3.348 | 98 | 7.7 | A |
| Ex. 3 | 3-K | 54.5 | 38.9 | 1.401 | No | 15.0 | B |
|  | 3-C | 72.0 | 24.9 | 2.892 | No | 14.9 | B |
|  | 3-M | 72.0 | 25.4 | 2.835 | No | 15.2 | A |
|  | 3-Y | 72.0 | 25.4 | 2.835 | No | 15.0 | A |
| Ex. 4 | 4-K | 48.0 | 45.4 | 1.057 | No | 4.9 | A |
|  | 4-C | 59.5 | 37.4 | 1.591 | No | 4.6 | A |
|  | 4-M | 59.5 | 37.9 | 1.570 | No | 4.2 | B |
|  | 4-Y | 59.5 | 37.9 | 1.570 | No | 4.5 | A |
| Ex. 5 | 5-K | 48.0 | 42.6 | 1.127 | No | 9.8 | A |
|  | 5-C | 61.0 | 34.1 | 1.789 | No | 10.1 | A |
|  | 5-M | 61.0 | 34.6 | 1.763 | No | 9.9 | A |
|  | 5-Y | 61.0 | 34.1 | 1.789 | No | 9.6 | A |
| Ex. 6 | 6-K | 52.0 | 38.6 | 1.347 | No | 19.8 | B |
|  | 6-C | 66.0 | 29.1 | 2.268 | No | 19.2 | B |
|  | 6-M | 66.0 | 29.6 | 2.230 | No | 19.0 | A |
|  | 6-Y | 66.0 | 29.1 | 2.268 | No | 19.1 | B |
| Ex. 7 | 7-K | 48.0 | 44.0 | 1.092 | No | 5.3 | A |
|  | 7-C | 59.0 | 37.5 | 1.575 | No | 5.4 | A |
|  | 7-M | 59.0 | 38.0 | 1.555 | No | 5.0 | A |
|  | 7-Y | 59.0 | 38.0 | 1.555 | No | 5.2 | A |
| Ex. 8 | 8-K | 51.5 | 40.3 | 1.279 | No | 9.7 | A |
|  | 8-C | 66.5 | 29.8 | 2.233 | No | 9.5 | A |
|  | 8-M | 66.5 | 30.3 | 2.196 | No | 9.4 | A |
|  | 8-Y | 66.5 | 30.3 | 2.196 | No | 9.5 | A |
| Ex. 9 | 7-K | 48.0 | 44.0 | 1.092 | No | 5.3 | A |
|  | 2-C | 75.0 | 21.9 | 3.425 | No | 7.8 | A |
|  | 8-M | 66.5 | 30.3 | 2.196 | No | 9.4 | A |
|  | 5-Y | 61.0 | 34.1 | 1.789 | No | 9.6 | A |
| Comp. Ex. 1 | 10-K | 57.0 | 36.4 | 1.566 | No | 35.1 | C |
|  | 10-C | 76.5 | 20.4 | 3.750 | No | 36.2 | D |
|  | 10-M | 76.5 | 20.9 | 3.660 | No | 36.0 | D |
|  | 10-Y | 76.5 | 20.9 | 3.660 | No | 35.4 | C |
| Comp. Ex. 2 | 11-K | 46.5 | 46.8 | 0.994 | No | 9.6 | A |
|  | 11-C | 58.0 | 38.8 | 1.496 | No | 10.3 | A |
|  | 11-M | 58.0 | 39.3 | 1.476 | No | 10.5 | A |
|  | 11-Y | 58.0 | 39.3 | 1.477 | No | 10.0 | A |
| Comp. Ex. 3 | 12-K | 62.0 | 30.0 | 2.070 | No | 9.1 | A |
|  | 12-C | 78.0 | 18.5 | 4.228 | 96 | 9.5 | A |
|  | 12-M | 78.0 | 19.0 | 4.116 | 96 | 9.4 | A |
|  | 12-Y | 78.0 | 19.0 | 4.116 | 96 | 9.6 | A |
| Comp. Ex. 4 | 13-K | 45.0 | 45.6 | 0.987 | No | 11.1 | A |
|  | 13-C | 75.5 | 20.8 | 3.633 | No | 14.3 | A |
|  | 13-M | 75.0 | 20.6 | 3.641 | No | 15.1 | A |
|  | 13-Y | 58.0 | 39.4 | 1.472 | No | 8.8 | A |

*If the ink uses a dye solution, the amount of water included in the dye solution is added to the amount of ion-exchange water used.

TABLE 2-2

|  | Ink | Curl Plain paper (a) | Curl Plain paper (b) | Penetration of ink Plain paper (a) | Penetration of ink Plain paper (b) | Color bleeding Plain paper (a) | Color bleeding Plain paper (b) |
|---|---|---|---|---|---|---|---|
| Ex. 1 | 1-K | B | B | A | B | — | — |
|  | 1-C | B | B | A | A | A | A |
|  | 1-M | B | B | A | B | A | B |
|  | 1-Y | B | B | A | A | A | B |
| Ex. 2 | 2-K | A | A | A | B | — | — |
|  | 2-C | A | A | B | B | A | B |
|  | 2-M | A | A | B | B | A | B |
|  | 2-Y | A | A | B | B | A | B |
| Ex. 3 | 3-K | A | B | A | B | — | — |
|  | 3-C | A | A | A | A | A | A |
|  | 3-M | A | A | B | B | A | A |
|  | 3-Y | A | A | B | B | A | B |
| Ex. 4 | 4-K | A | B | B | B | — | — |
|  | 4-C | A | B | A | B | B | B |
|  | 4-M | A | A | B | B | B | B |
|  | 4-Y | A | A | B | B | B | B |
| Ex. 5 | 5-K | B | B | A | B | — | — |
|  | 5-C | B | B | A | A | A | A |
|  | 5-M | A | A | A | A | A | B |
|  | 5-Y | A | A | B | B | A | B |
| Ex. 6 | 6-K | B | B | A | A | — | — |
|  | 6-C | B | B | A | B | A | B |
|  | 6-M | B | B | A | A | A | A |
|  | 6-Y | B | B | A | A | A | A |
| Ex. 7 | 7-K | A | B | B | A | — | — |
|  | 7-C | A | A | A | A | A | A |
|  | 7-M | A | A | A | A | A | B |
|  | 7-Y | A | A | A | A | A | A |
| Ex. 8 | 8-K | A | A | A | A | — | — |
|  | 8-C | A | A | A | A | A | A |
|  | 8-M | A | A | A | A | A | A |
|  | 8-Y | A | A | A | A | A | A |
| Ex. 9 | 7-K | A | B | B | A | — | — |
|  | 2-C | A | A | B | B | B | B |
|  | 8-M | A | A | A | A | A | A |
|  | 5-Y | A | A | B | B | A | A |
| Comp. Ex. 1 | 10-K | C | D | B | C | — | — |
|  | 10-C | C | D | B | B | B | C |
|  | 10-M | C | D | C | B | A | B |
|  | 10-Y | C | D | B | B | B | C |
| Comp. Ex. 2 | 11-K | D | D | A | A | — | — |
|  | 11-C | C | C | B | A | B | C |
|  | 11-M | C | C | A | B | B | C |
|  | 11-Y | C | C | B | A | C | C |
| Comp. Ex. 3 | 12-K | A | B | C | D | — | — |
|  | 12-C | A | A | B | C | B | B |
|  | 12-M | A | A | C | C | B | B |
|  | 12-Y | A | B | C | D | B | C |
| Comp. Ex. 4 | 13-K | B | C | B | C | — | — |
|  | 13-C | C | C | B | C | A | A |
|  | 13-M | C | D | C | C | A | B |
|  | 13-Y | B | C | B | A | C | C |

It is clear from Tables 2-1 and 2-2 that the inkjet ink set of the present invention can produce high quality images without causing the curling problem, the ink penetration problem and the color bleeding problem.

Additional modifications and variations of the present invention are possible in light of the above teachings. It is therefore to be understood that within the scope of the appended claims the invention may be practiced other than as specifically described herein.

What is claimed is:

1. An inkjet ink set comprising:
at least a black ink;
a cyan ink;
a magenta ink; and
a yellow ink,
wherein each of the black, cyan, magenta and yellow inks includes:
at least a water-soluble dye;
water; and
a water-soluble solvent having the following formula (1):

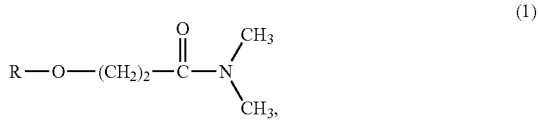

(1)

wherein R represents a linear alkyl group having 1 to 5 carbon atoms, and
wherein each of the cyan, magenta and yellow inks satisfies a relationship, $1.5 \leq S/W \leq 3.5$, wherein S represents a content of the water-soluble solvent in each ink, and W represents a content of water in each ink, and the black ink satisfies another relationship, $1.0 \leq S/W \leq 1.5$, wherein S represents a content of the water-soluble solvent in the black ink, and W represents a content of water in the black ink.

2. The inkjet ink set according to claim 1, wherein each of the black, cyan, magenta and yellow inks has a viscosity of 5 mP·s to 20 mP·s at 25° C., and no flash point.

3. The inkjet ink set according to claim 1, wherein each of the black, cyan, magenta and yellow inks further includes a second water-soluble solvent selected from the group consisting of 1,3-butanediol, 3-methyl-1,3-butanediol, 3-ethyl-3-hydroxymethyloxetane, 2-ethyl-1,3-hexanediol, and 2,2,4-trimethyl-1,3-pentanediol.

4. The inkjet ink set according to claim 1, wherein each of the black, cyan, magenta and yellow inks further includes a surfactant selected from the group consisting of compounds having the following formula (2):

$$HOR^1R^3C-(CH_2)_j-CR^2R^4OH \quad (2),$$

wherein each of $R^1$ and $R^2$ represents an alkyl group having 3 to 6 carbon atoms, each of $R^3$ and $R^4$ represents an alkyl group having 1 to 2 carbon atoms, and j is an integer of from 1 to 6; and compounds having the following formula (3):

$$Rf^1\text{-}CH_2CH(OH)CH_2O-(CH_2CH_2O)_k\text{-}Q \quad (3),$$

wherein $Rf^1$ represents $-C_3F_7$ or $-C_4F_9$, Q represents a group having a formula $-C_bH_{2b+1}$ wherein b is an integer of from 11 to 19, $-CH_2CH(OH)CH_2-C_3F_7$, or $-CH_2CH(OH)CH_2-C_4F_9$, and k is an integer of from 20 to 35.

5. The inkjet ink set according to claim 1, wherein the water-soluble dye of the yellow ink has the following formula (4) or (5):

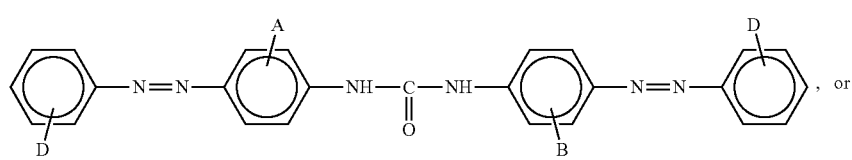

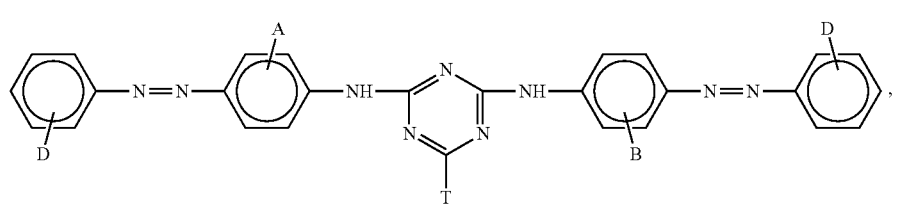

wherein A represents an alkoxyl group, B represents an alkoxyl group, T represents an alkanolamine group, and D represents $-SO_3M$ wherein M represents an alkali metal.

6. The inkjet ink set according to claim 1, wherein the water-soluble dye of the magenta ink has the following formula (6):

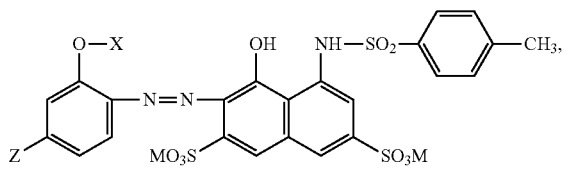

wherein X represents a hydrogen atom or a phenyl group, Z represents a hydrogen atom or a halogen atom, and M represents an alkali metal.

7. The inkjet ink set according to claim 1, wherein the water-soluble dye of the cyan ink has the following formula (7):

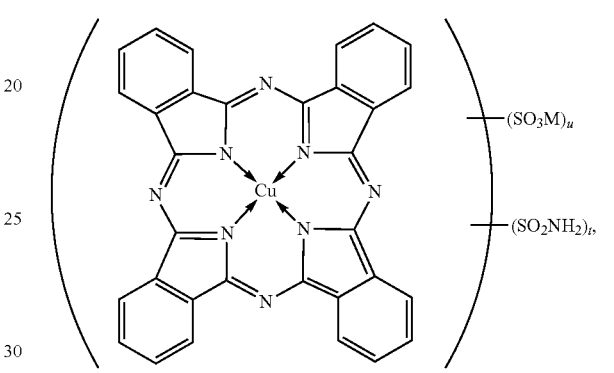

wherein M represents an alkali metal or a quaternary ammonium group, t is 0 or an integer of 1 to 3, and u is 1 or 2.

8. An inkjet recording method comprising:
ejecting droplets of the inkjet ink set according to claim 1 toward a recording material to form an image on the recording material.

9. A print comprising:
a support; and
an image formed on the support by the image forming method according to claim 8.

* * * * *